(12) United States Patent
Sakata et al.

(10) Patent No.: US 9,021,395 B2
(45) Date of Patent: Apr. 28, 2015

(54) DISPLAY CONTROL DEVICE, INTEGRATED CIRCUIT, AND DISPLAY CONTROL METHOD

(71) Applicant: Panasonic Intellectual Property Corporation of America, Torrance, CA (US)

(72) Inventors: Kotaro Sakata, Tokyo (JP); Shigenori Maeda, Kyoto (JP); Masaki Yamauchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 166 days.

(21) Appl. No.: 13/989,875

(22) PCT Filed: Sep. 27, 2012

(86) PCT No.: PCT/JP2012/006187
§ 371 (c)(1),
(2) Date: May 28, 2013

(87) PCT Pub. No.: WO2013/057882
PCT Pub. Date: Apr. 25, 2013

(65) Prior Publication Data
US 2014/0053105 A1    Feb. 20, 2014

(30) Foreign Application Priority Data

Oct. 19, 2011    (JP) ................................ 2011-229825

(51) Int. Cl.
*G06F 3/048*    (2013.01)
*G06F 3/0484*    (2013.01)
(Continued)

(52) U.S. Cl.
CPC .......... *G06F 3/04842* (2013.01); *G06F 3/0237* (2013.01); *H04N 21/44218* (2013.01);
(Continued)

(58) Field of Classification Search
CPC ..................................................... G06F 3/0237
USPC ........................................................... 715/811
See application file for complete search history.

(56) References Cited

U.S. PATENT DOCUMENTS 6,389,593 B1    5/2002    Yamagashi
6,943,845 B2    9/2005    Mizutone et al.
(Continued)

FOREIGN PATENT DOCUMENTS

JP    05-020016    1/1993
JP    11-272705    10/1999
(Continued)

OTHER PUBLICATIONS

International Search Report issued Dec. 18, 2012 in International (PCT) Application No. PCT/JP2012/006187.
(Continued)

*Primary Examiner* — William Titcomb
(74) *Attorney, Agent, or Firm* — Wenderoth, Lind & Ponack, L.L.P.

(57) ABSTRACT

Included are: a plural-push information management unit; a screen attention degree determination unit; a selection operation history collection unit; a selection probability calculation unit calculating a user's selection probability for each category; and a display style determination unit causing pieces of push information in a category having a higher probability to be displayed in a more easily selectable display style. The categories include a relevance category including pieces of push information regarding content displayed on the screen. The selection probability calculation unit calculates a selection probability of the relevance category having a first attention degree as a screen attention degree to be higher than that having the second attention degree lower than the first attention degree; and calculates a selection probability having a first number as the number of selection times to be higher than that having a second number smaller than the first number.

26 Claims, 31 Drawing Sheets

(51) Int. Cl.
  *H04N 21/442* (2011.01)
  *H04N 21/431* (2011.01)
  *H04N 21/436* (2011.01)
  *H04N 21/45* (2011.01)
  *H04N 21/475* (2011.01)
  *H04N 21/488* (2011.01)
  *G06K 9/00* (2006.01)
  *G06F 3/023* (2006.01)

(52) U.S. Cl.
  CPC ..... *H04N21/44222* (2013.01); *H04N 21/4312* (2013.01); *H04N 21/43615* (2013.01); *H04N 21/44227* (2013.01); *H04N 21/4532* (2013.01); *H04N 21/4756* (2013.01); *H04N 21/4882* (2013.01); *G06K 9/00604* (2013.01)

(56) References Cited

U.S. PATENT DOCUMENTS

| | | | |
|---|---|---|---|
| 8,255,421 B2* | 8/2012 | Maeda et al. | 707/791 |
| 2002/0078447 A1 | 6/2002 | Mizutone et al. | |
| 2005/0190295 A1 | 9/2005 | Mizutone et al. | |
| 2006/0024021 A1 | 2/2006 | Utsuki et al. | |
| 2010/0250196 A1* | 9/2010 | Lawler et al. | 702/184 |
| 2011/0029922 A1* | 2/2011 | Hoffberg et al. | 715/811 |
| 2011/0126154 A1* | 5/2011 | Boehler et al. | 715/811 |
| 2012/0183273 A1 | 7/2012 | Utsuki et al. | |
| 2013/0007662 A1* | 1/2013 | Bank et al. | 715/811 |
| 2013/0080974 A1* | 3/2013 | Suzuki | 715/811 |

FOREIGN PATENT DOCUMENTS

| | | |
|---|---|---|
| JP | 2006-33776 | 2/2006 |
| JP | 3747541 | 2/2006 |
| JP | 2007-179249 | 7/2007 |
| JP | 4046994 | 2/2008 |
| JP | 2010-140307 | 6/2010 |

OTHER PUBLICATIONS

Kazuo Yoshimoto et al., "User Interface and Services of Intertext System for Television Broadcasting Systems", Toshiba Review, vol. 51, No. 10 (Special Issues: Digital Image Signal Processing Technologies for Multimedia), Oct. 1996 with English abstract.

* cited by examiner

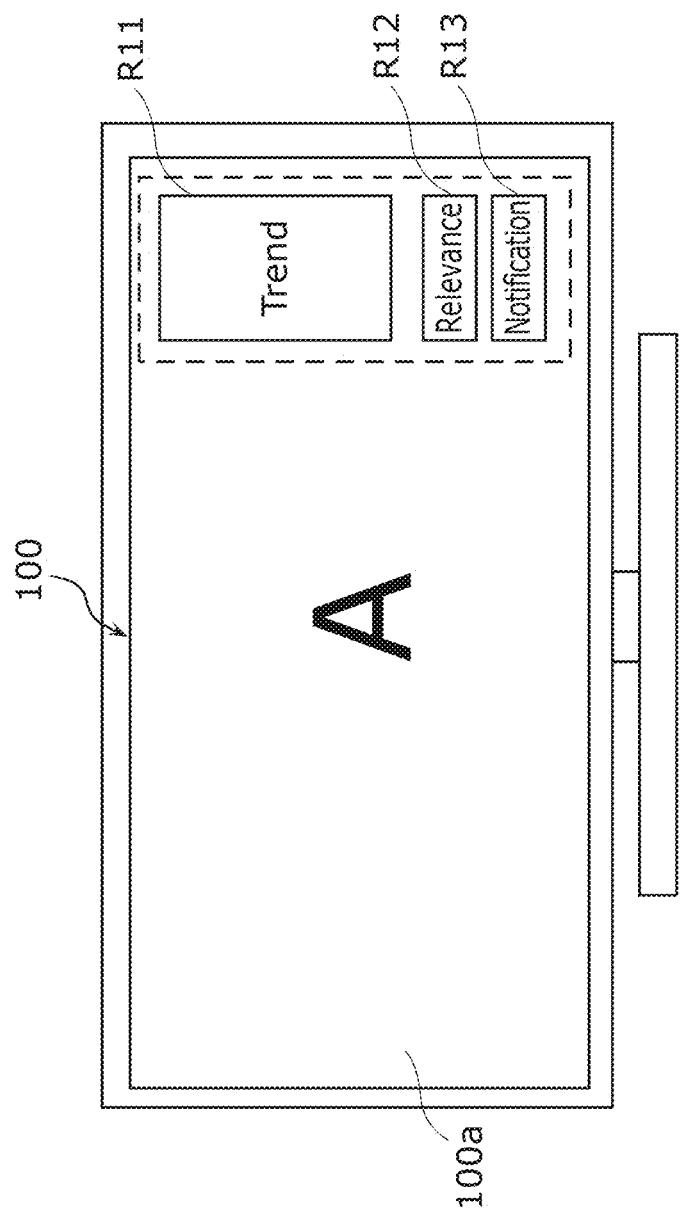

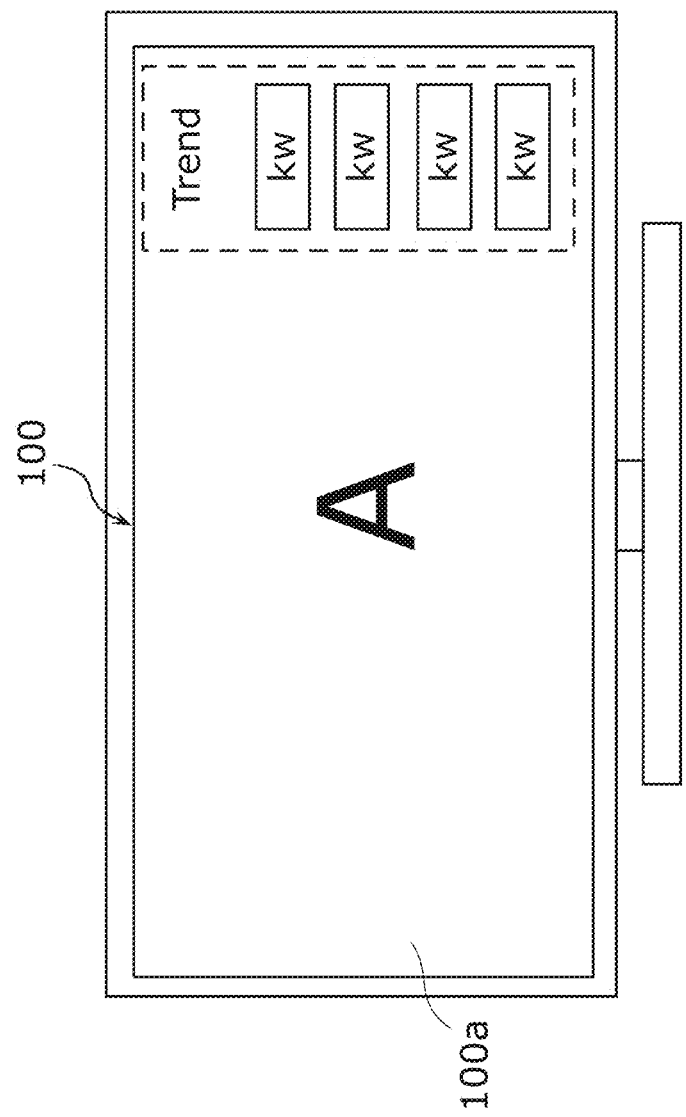

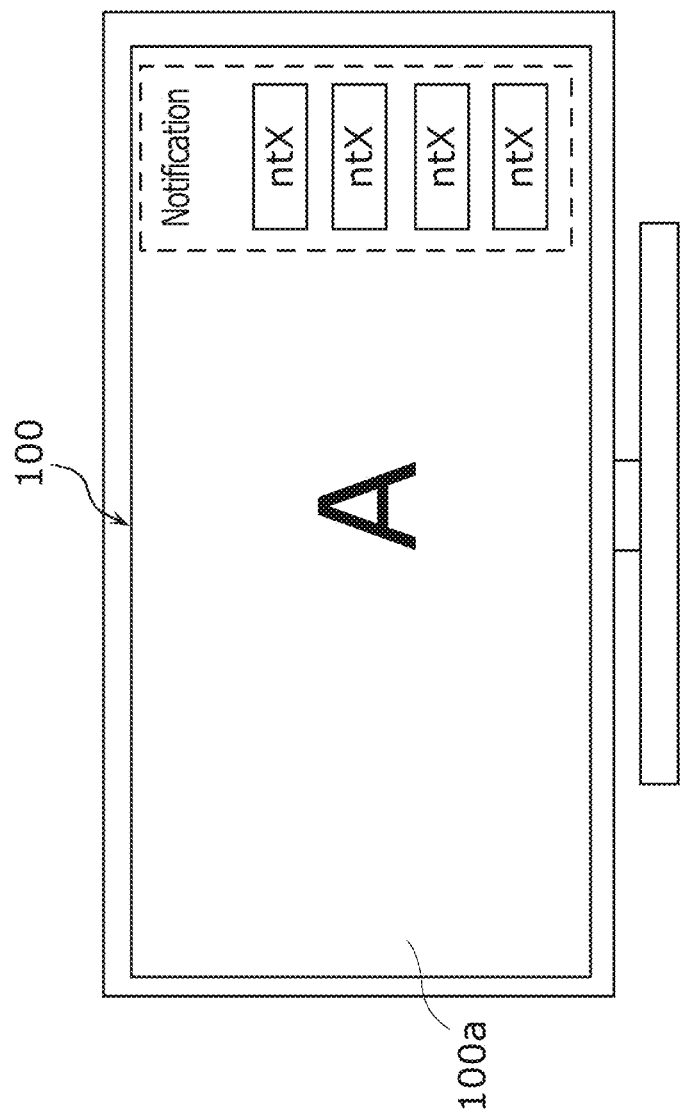

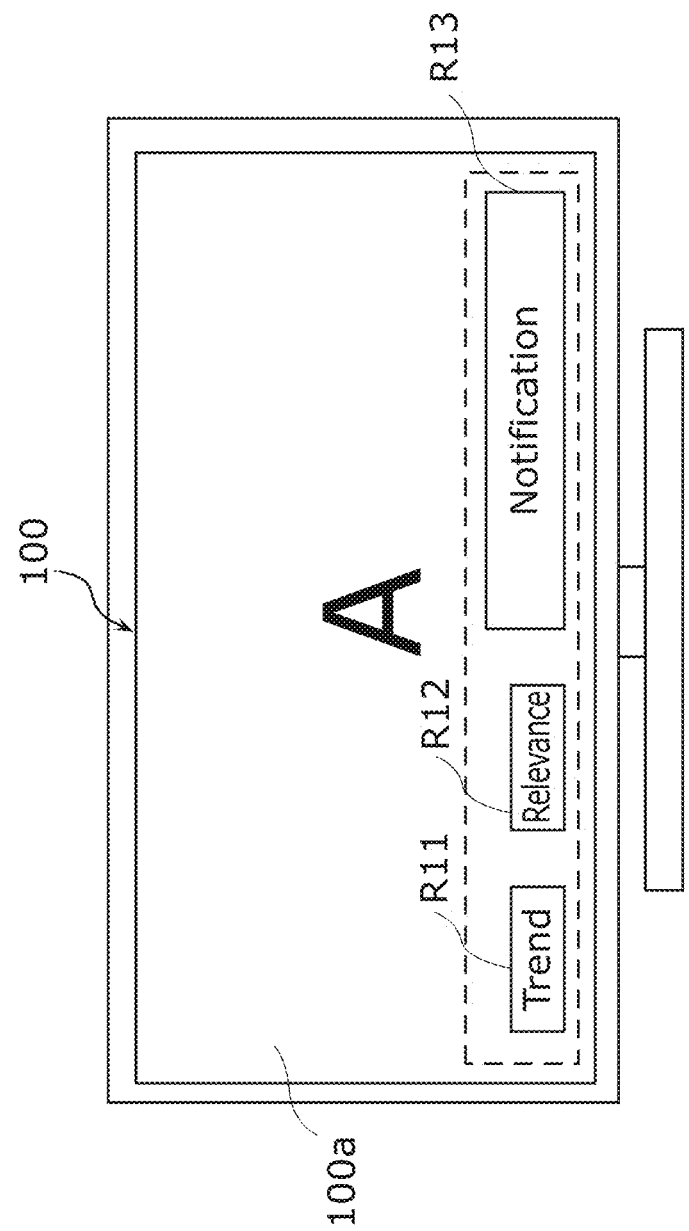

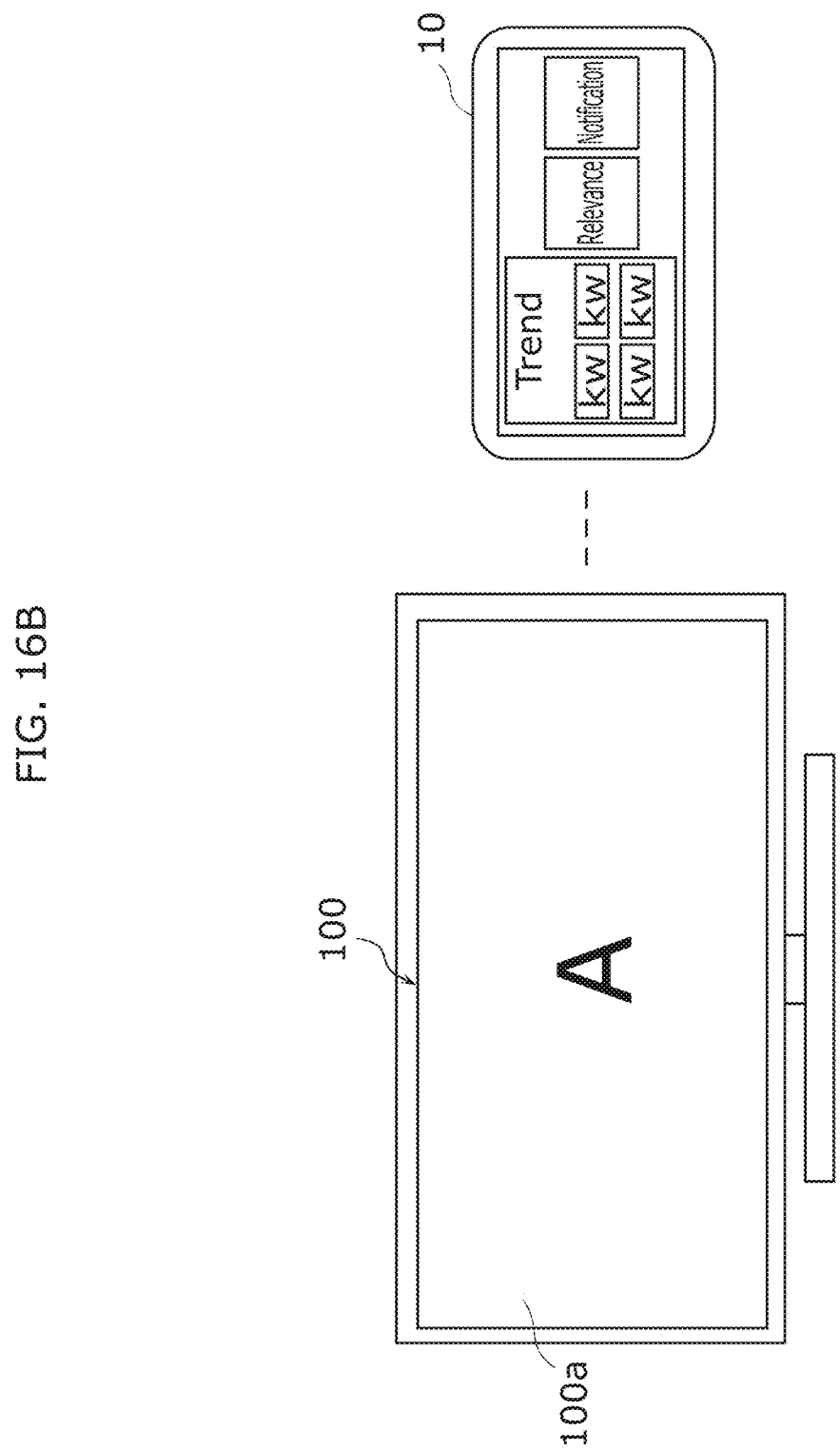

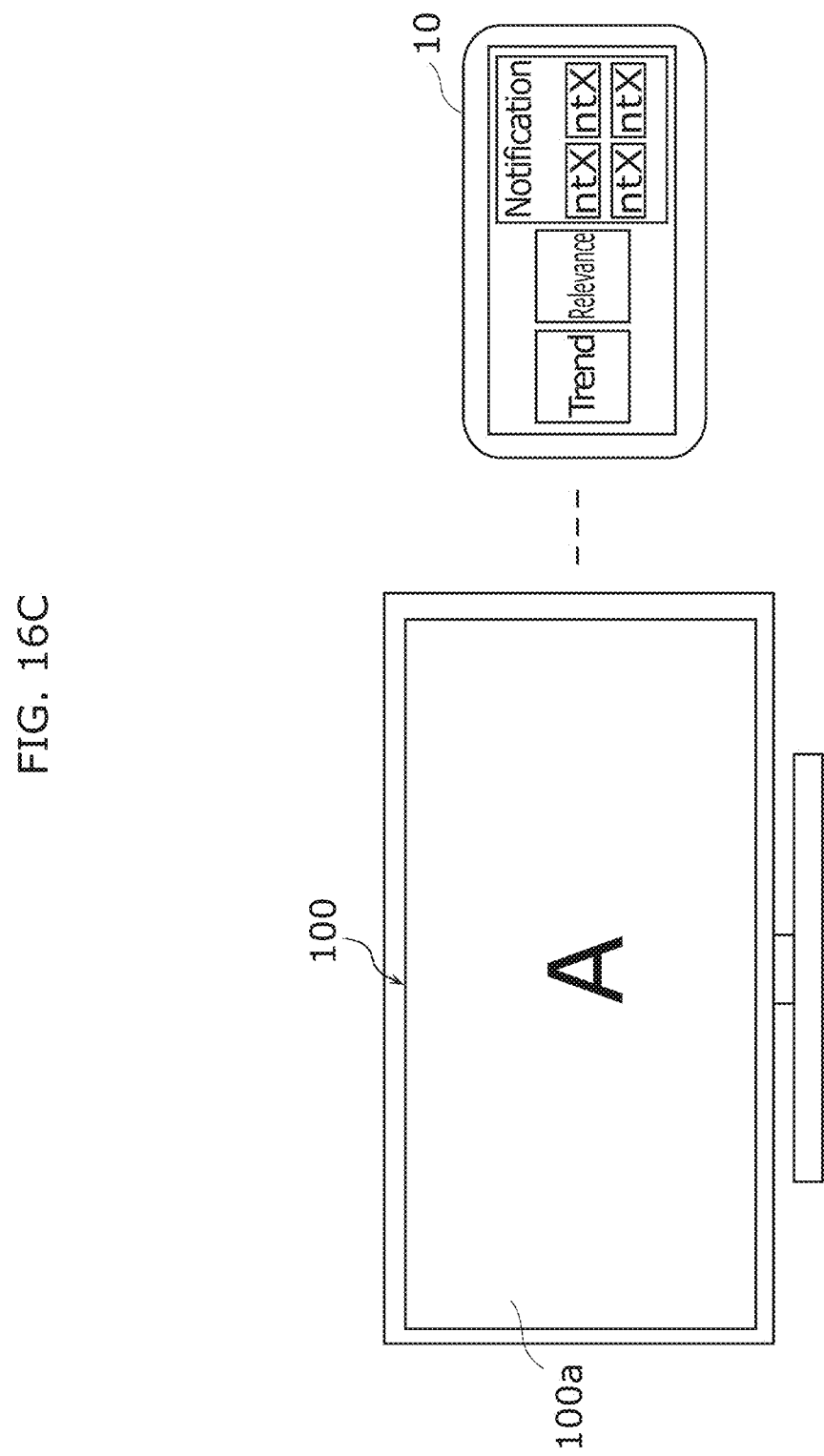

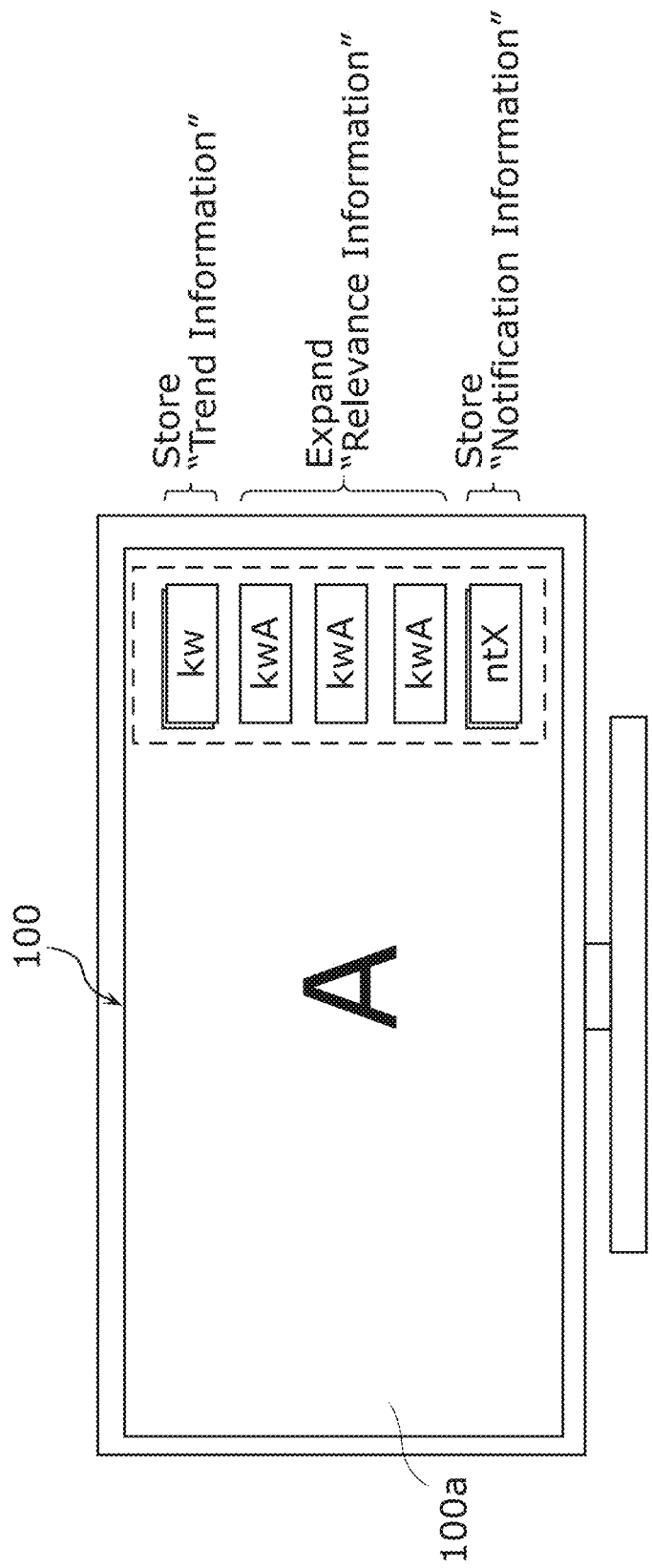

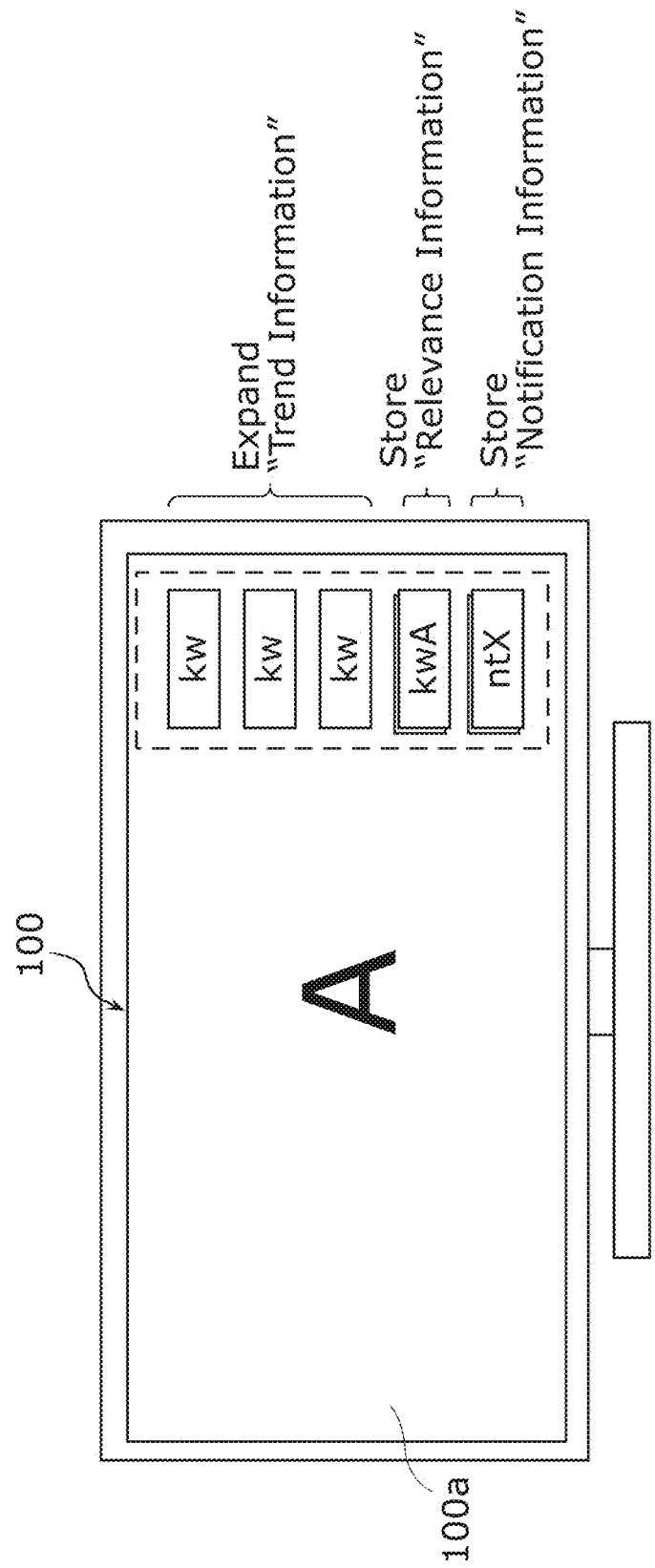

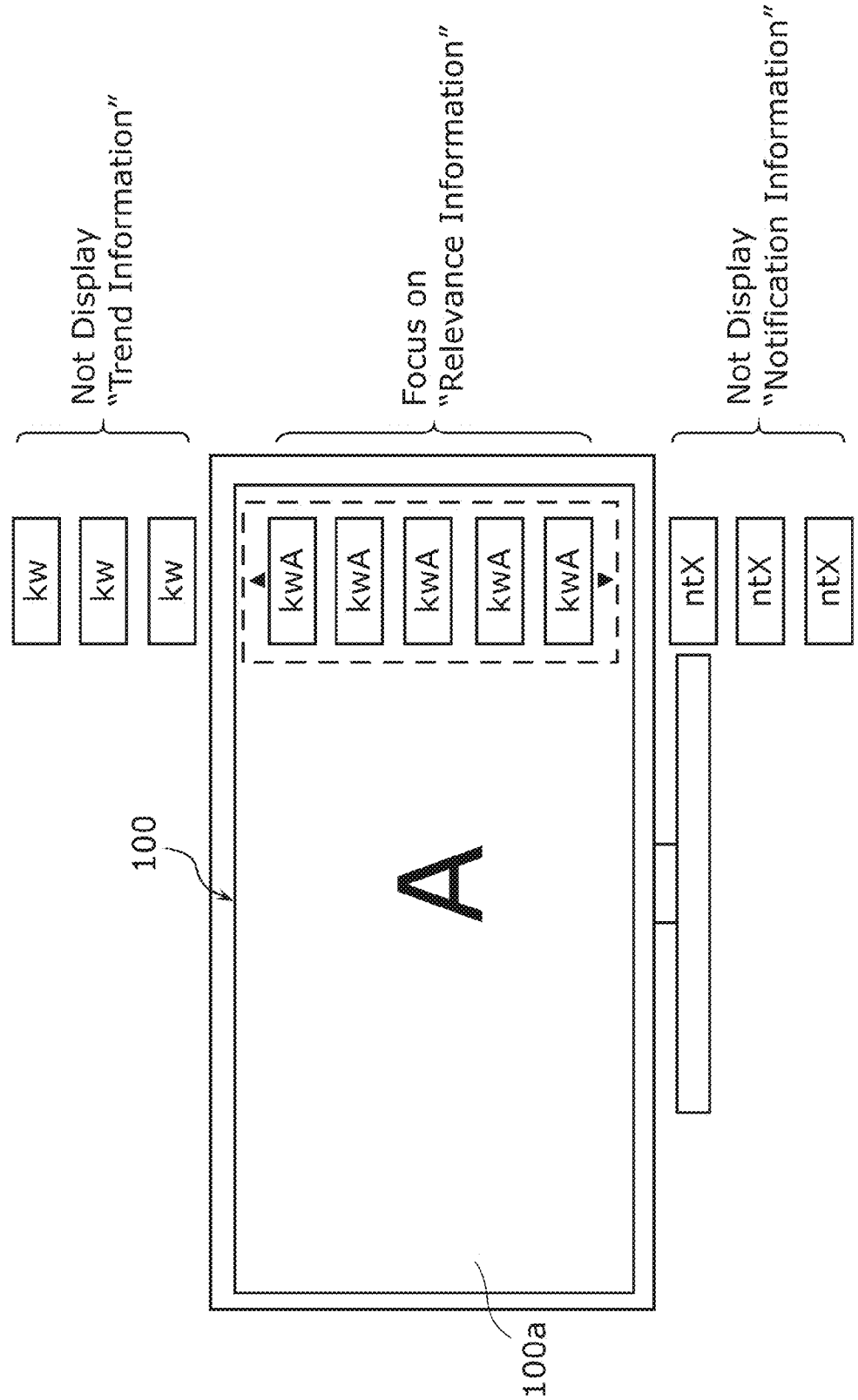

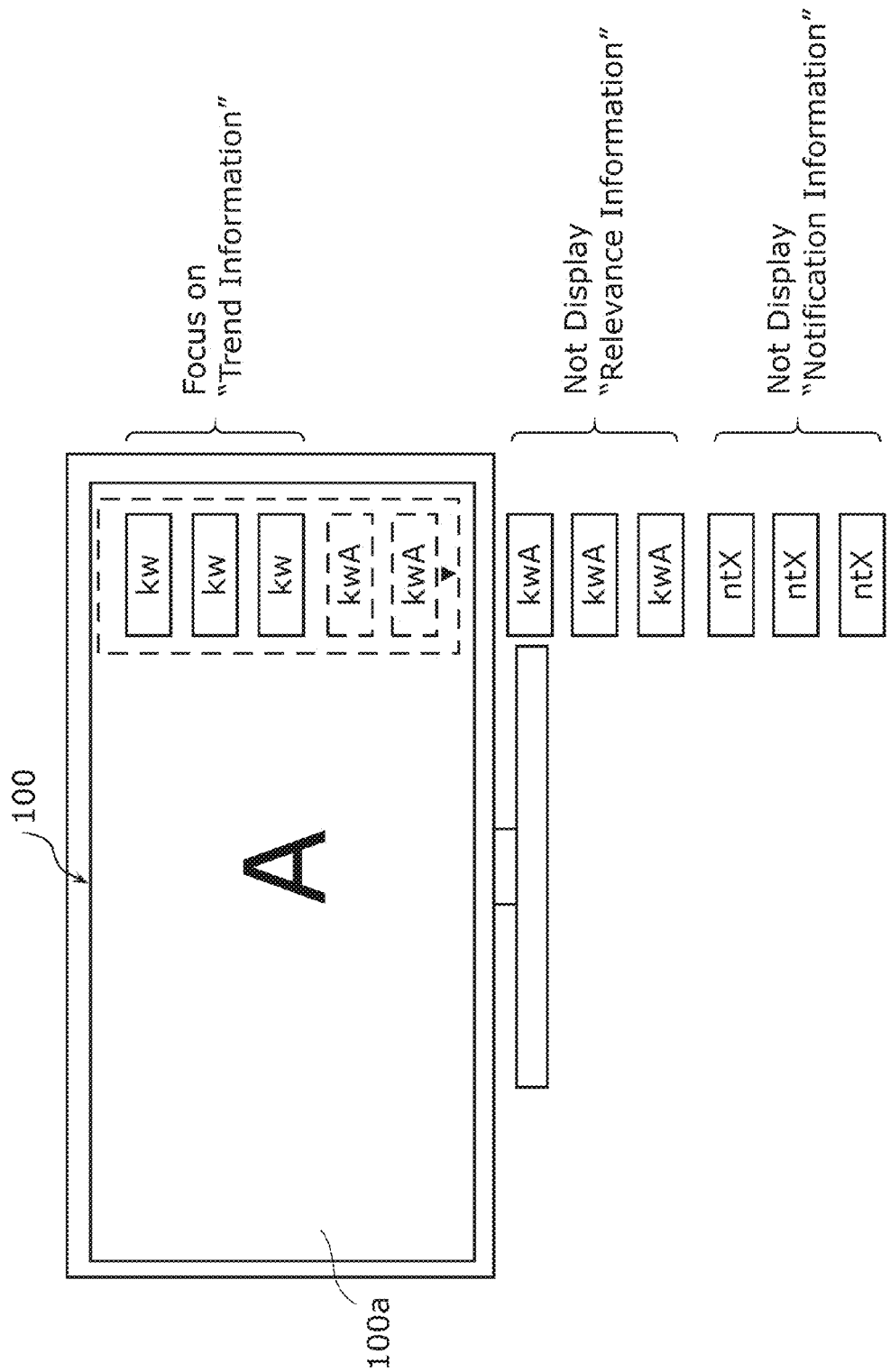

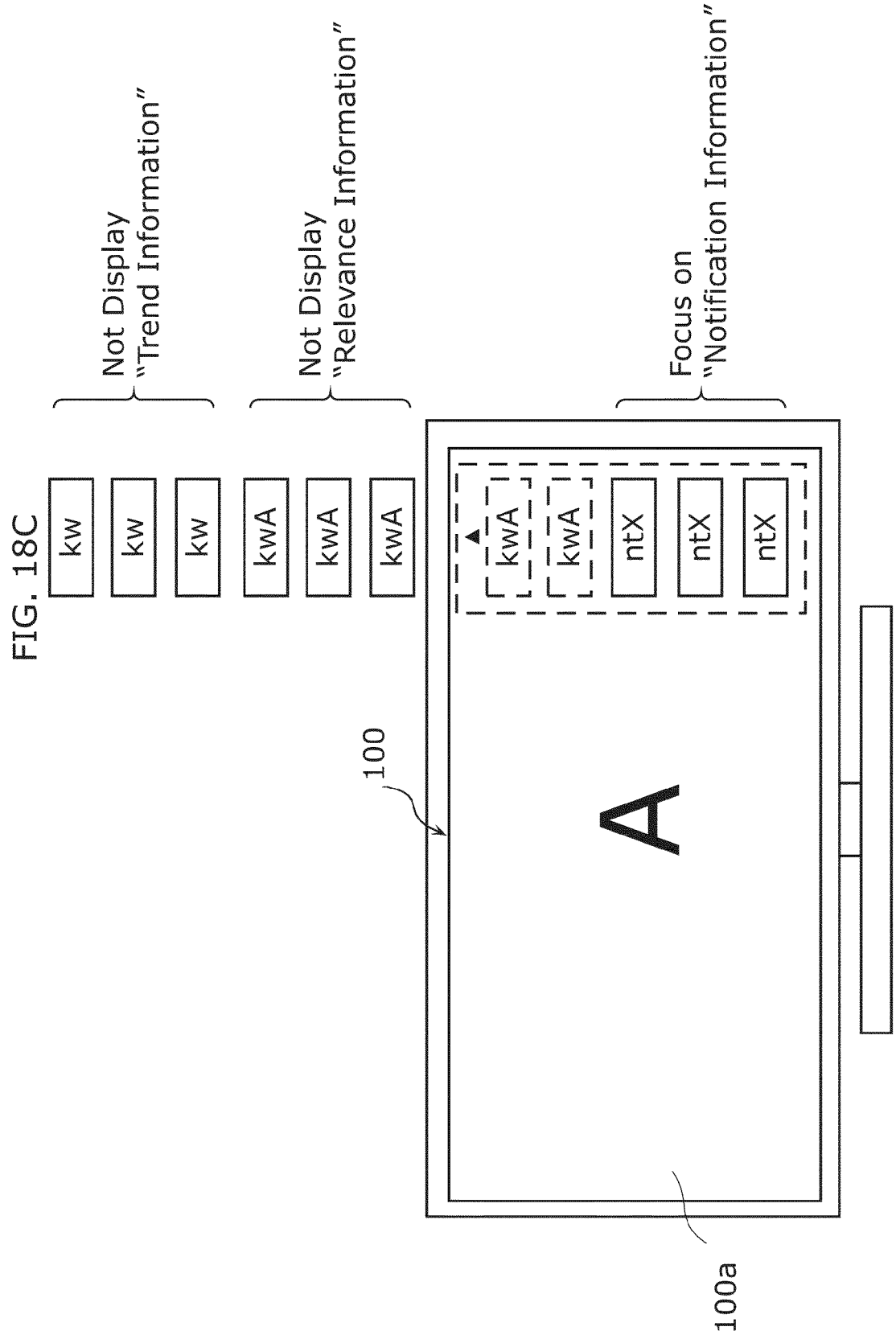

DISPLAY CONTROL DEVICE, INTEGRATED CIRCUIT, AND DISPLAY CONTROL METHOD

TECHNICAL FIELD

The present disclosure relates to display control devices that control a display unit to perform displaying on a screen.

BACKGROUND ART

Conventionally, there are a technique of controlling a method of displaying program-related information based on a viewing history and a technique of selecting a viewing style such as a screen conformation or the like based on a viewing history (see Patent Literature 1). There is also a known technique of determining a viewing style of an input source based on a user's past viewing history (see Patent Literature 2).

CITATION LIST

Patent Literature

[Patent Literature 1] Japanese Patent No. 3747541
[Patent Literature 2] Japanese Patent No. 4046994

SUMMARY OF INVENTION

Technical Problem

However, for the conventional techniques, as a variety of devices connected to a network is increased, a variety of information to be pushed (push information) is also increased for display devices that present information, such as television sets, tablet terminals, and smartphones. Therefore, there is a problem that it is difficult to easily select push information in a category the user desires to select.

In order to solve the above-described problem, there is provided a display control device and the like capable of displaying items having a high possibility of being selected by a user.

Solution to Problem

In accordance with an aspect of the present disclosure for achieving the object, there is provided a display control device that controls a display unit having a screen to perform displaying, the display control device comprising: a management unit configured to manage items each belonging to any one of categories; a screen attention degree determination unit configured to determine a screen attention degree indicating how much a user pays attention to the screen of the display unit; a selection operation history collection unit configured to collect selection operation history information indicating a history of selection of each of the categories; a selection probability calculation unit configured to calculate a selection probability of being selected by the user, for each of the categories based on the screen attention degree and the selection operation history information; and a display style determination unit configured to (i) determine a display style allowing the user to more easily select an item in a category having a higher selection probability among the categories, and (ii) cause the display unit to display the item in the determined display style, wherein the categories include a relevance category that is a category including items related to a piece of content displayed on the screen, and the selection probability calculation unit is configured to: calculate a selection probability of the relevance category in a case where the screen attention degree is a first attention degree to be higher than a selection probability of the relevance category in a case where the screen attention degree is a second attention degree that is lower than the first attention degree; and calculate, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

The general and specific aspect may be implemented as a method, an integrated circuit, a computer program, and a computer-readable recording medium, such as a Compact Disc-Read Only Memory (CD-ROM), and may be implemented also as a desired combination of them.

Advantageous Effects of Invention

The display control device according to the present disclosure is capable of displaying items having a high probability of being selected by a user from among a plurality of categories each including a plurality of items.

BRIEF DESCRIPTION OF DRAWINGS

FIG. 13B is a diagram for explaining an example of display of pieces of push information when pieces of trend information have the highest selection probability.

FIG. 14B is a diagram for explaining another example of display of pieces of push information when pieces of trend information have the highest selection probability.

FIG. 14C is a diagram for explaining another example of display of pieces of push information when pieces of notification information have the highest selection probability.

FIG. 15C is a diagram for explaining still another example of display of pieces of push information when pieces of notification information have the highest selection probability.

FIG. 16B is a diagram for explaining still another example of display of pieces of push information when pieces of trend information have the highest selection probability.

FIG. 16C is a diagram for explaining still another example of display of pieces of push information when pieces of notification information have the highest selection probability.

FIG. 17A is a diagram for explaining still another example of display of pieces of push information when pieces of relevant information have the highest selection probability.

FIG. 17B is a diagram for explaining still another example of display of pieces of push information when pieces of trend information have the highest selection probability.

FIG. 18A is a diagram for explaining still another example of display of pieces of push information when pieces of relevant information have the highest selection probability.

FIG. 18B is a diagram for explaining still another example of display of pieces of push information when pieces of trend information have the highest selection probability.

FIG. 18C is a diagram for explaining still another example of display of pieces of push information when pieces of notification information have the highest selection probability.

DESCRIPTION OF EMBODIMENTS

Figure 1A:
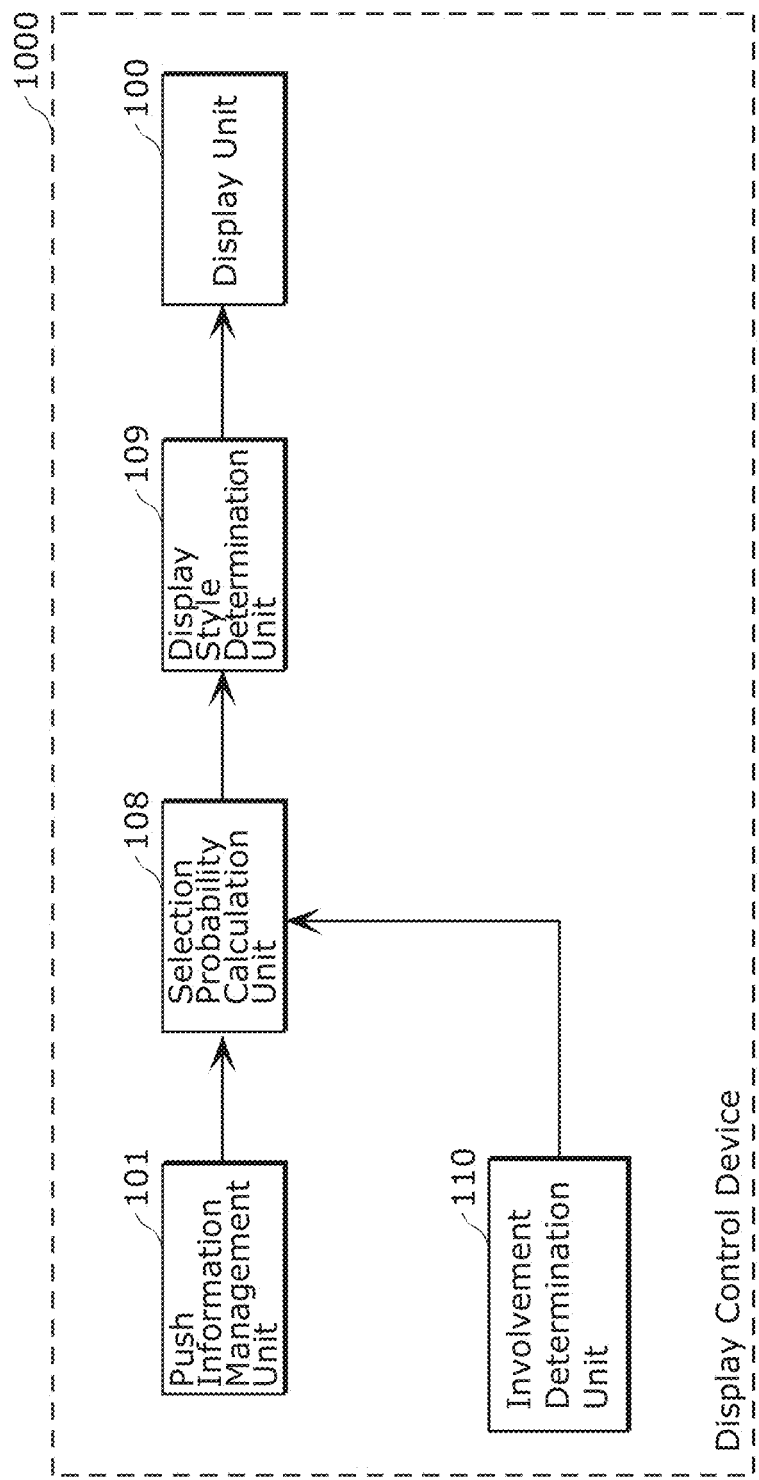
FIG. 1A is a block diagram showing a functional structure of a display control device according to an embodiment.

Observation Based on which Present Disclosure is Conceived

The inventors of the present disclosure found the following problems in the display control devices disclosed in "Background Art".

The advance of combination between broadcasting and communication allows television sets to be used not only for pieces of viewing broadcast content but also for serving as displays on which various pieces information such as web information can be browsed. One of such new functions of television sets is proposed to notify various kinds of information relating to life at appropriate times.

In recent years, network functions among electrical devices are widely used. It is possible that a Blu-ray Disc (BD) recorder and a network camera are cooperated with a television set in order to operate a plurality of devices using a single remote controller or to check images captured by the network camera on a screen of the television set.

Furthermore, if home appliances, such as a washing machine, a refrigerator, and a microwave, in addition to these devices are cooperated with the television set, it is possible to check pieces of information of these appliances and devices, such as their operation states, on the television set. In other words, if a display device such as a television set is cooperated with other appliances/devices via a network to enable the display device to display pieces of information obtained from these appliances/devices, the user can refer to these pieces of information on the display device without going to the appliances/devices.

In the technique disclosed in Patent Literature 1, the following processing is performed by a program-related information transmission control device at a data distributing side that transmits program-related information related to each of programs provided to a data receiving side via a data transmission means.

The program-related information transmission control device gets viewing history information that is obtained from the data receiving side according to a viewing operation. Then, the program-related information transmission control device controls conditions for sending program-related information of each program based on the viewing history information.

The information processing device disclosed in Patent Literature 2 stores a user's past viewing pattern as history information. Then, when videos or audios of input sources provided from a plurality of media are outputted at the same time, the information processing device automatically determines a viewing style of the input sources to match a user's preference based on the above-described history information.

However, in the techniques disclosed in Patent Literatures 1 and 2, as a variety of devices connected to a network is increased, a variety of information to be pushed (push information) is also increased for display devices that present information, such as television sets, tablet terminals, and smartphones. Therefore, there is a problem that it is difficult to easily select push information in a category the user desires to select.

In accordance with an aspect of the present disclosure for solving the above problems, there is provided a display control device that controls a display unit having a screen to perform displaying, the display control device comprising: a management unit configured to manage items each belonging to any one of categories; a screen attention degree determination unit configured to determine a screen attention degree indicating how much a user pays attention to the screen of the display unit; a selection operation history collection unit configured to collect selection operation history information indicating a history of selection of each of the categories; a selection probability calculation unit configured to calculate a selection probability of being selected by the user, for each of the categories based on the screen attention degree and the selection operation history information; and a display style determination unit configured to (i) determine a display style allowing the user to more easily select an item in a category having a higher selection probability among the categories, and (ii) cause the display unit to display the item in the determined display style, wherein the categories include a relevance category that is a category including items related to a piece of content displayed on the screen, and the selection probability calculation unit is configured to: calculate a selection probability of the relevance category in a case where the screen attention degree is a first attention degree to be higher than a selection probability of the relevance category in a case where the screen attention degree is a second attention degree that is lower than the first attention degree; and calculate, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

More specifically, the display style determination unit sets a display style allowing a user to more easily select items in a category having a higher selection probability among the categories.

With this structure, it is possible to easily select items in a category having a high probability of being selected by the user from among a plurality of categories each including a plurality of items. In other words, it is possible to provide a display control device capable of performing display control to allow the user to easily access items in a category having a high probability of being selected by the user among items in various categories.

In short, the display control device according to the aspect is capable of displaying items having a high possibility of being selected by the user.

For example, it is possible that the display control device communicates at least one electrical device, the categories including a notification category that is a category includes items notified from the at least one electrical device, the display control device further comprises a device operation history collection unit configured to collect device operation history information indicating a history of operation of the at least one electrical device by the user, and the selection probability calculation unit is further configured to calculate, based on the device operation history information, a selection probability of the notification category in a case where a total number of operation times the at least one electrical device has been operated is a third number, to be higher than a selection probability of the notification category in a case where the total number of the operation times is a fourth number that is smaller than the third number.

With this structure, it is possible to display the items in the notification category in a display style allowing the user to easily select the items, based on user's past operation history.

For example, it is possible that each of the items in the notification category is associated with an announcement intensity which is an importance of notifying the user of the each of the items, and the selection probability calculation unit is configured to calculate a selection probability of the notification category in a case where the announcement intensity is a first intensity, to be higher than a selection probability of the notification category in a case where the announcement intensity is a second intensity that is lower than the first intensity.

With this structure, when the user is required to immediately operate an electrical device, the display unit can display the items in the notification category in a display style allowing the user to easily select the items. It is thereby possible to increase a possibility that the user will select the item in the notification category.

For example, it is possible that the items each belonging to any one of categories are push information transmitted from an external device communicating with the display control device.

For example, it is possible that the display unit is configured to display a piece of content, and the display style determination unit is configured to cause the display unit to display the items each belonging to any one of categories to overlap the piece of content in the determined display style.

The above structure causes the user to notice the items displayed on the screen, without interrupting user's viewing the content.

For example, it is possible that the display style determination unit is configured to determine a display style of a display label of a category having a highest selection probability among the categories to be displayed in more detail than a display style of a display label of an other category other than the category having the highest selection probability.

With the above structure, the user can easily select the items in the category having the highest selection probability. In addition, the other categories except the category having the highest selection probability are abstractly displayed in comparison to the category having the highest selection probability. This reduces botheration in viewing the screen.

For example, it is possible that the display style determination unit is configured to associate the display label of the category having the highest selection probability with the category and each of items belonging to the category, and associate the display style of the display label of the other category only with the other category.

With the above structure, the user can easily check items in a category having the highest selection probability.

For example, it is possible that the display style determination unit is configured to determine a display region for each of items in a category having a highest selection probability among the categories to be larger than a display region for each of items in an other category other than the category having the highest selection probability.

With the above structure, the user can easily select items in a category having the highest selection probability.

For example, it is possible that the display style determination unit is configured to cause a total number of displayed items in a category having a highest selection probability among the categories to be greater than a total number of displayed items in an other category other than the category having the highest selection probability.

With the above structure, the user can easily access items in a category having the highest selection probability.

For example, it is possible that the display style determination unit is configured to determine to display display labels of the items in the category having the highest selection probability to be arranged not to overlap each other, and display display labels of items in the other category to overlap each other.

For example, it is possible that the display style determination unit is configured to determine a chain including the items each belonging to any one of categories, and move the items forming the chain in a chain direction to locate a focus position on the screen, the focus position being the items in the category having the highest selection probability.

For example, it is possible that the screen attention degree determination unit includes a sight line detection unit configured to detect a sight line direction of the user, and the screen attention degree determination unit is configured to determine the screen attention degree based on the sight line direction detected by the sight line detection unit.

With the above structure, it is possible that, for example, when a user's sight line direction is from the user to the screen, it is determined a screen attention degree as high.

For example, it is possible that the display unit is configured to display a piece of content, and the screen attention degree determination unit is configured to determine the screen attention degree based on a genre of the piece of content displayed by the display unit.

With the above structure, it is possible to display items having a high possibility of being selected by the user, based on a genre of a piece of content. For example, in the case where a genre of a piece of content is a drama, the user often pays attention to the screen to understand a drama's story. This means that a screen attention degree is high. Therefore, in this case, items related to the drama are displayed in a display style allowing the user to easily select the items. As a result, there is a high possibility that the user paying attention to the screen to understand the drama's story will select the items. On the other hand, for example, if a genre of a piece of content is a variety program, the user is often doing other thing viewing the screen, in other words, the user is often not concentrated on the content. This means that a screen attention degree is low. Therefore, in this case, items not related to the variety program are displayed in a display style allowing the user to easily select the items. As a result, there is a high possibility that the user not concentrated on the variety program will select the items.

For example, it is possible that the display unit is configured to display a piece of content, and the screen attention degree determination unit is configured to determine the screen attention degree based on a viewing completion rate of the piece of content displayed by the display unit.

With the above structure, for example, when a viewing completion rate is high, items in the relevance category can be displayed in a display style allowing the user to easily select the items.

For example, it is possible that the display control device is operated by an input unit used to operate the display control device, and the screen attention degree determination unit is configured to determine the screen attention degree based on user's operation on the input unit.

With the above structure, for example, when a frequency of user's operation on the input device is high, items in a category having a high possibility of being selected by the user can be displayed in a display style allowing the user to easily select the items.

For example, it is possible that the input unit is a remote controller.

For example, it is possible that the input unit is one of a smartphone and a tablet terminal.

For example, it is possible that the screen attention degree determination unit further includes a facial expression determination unit configured to determine facial expression of the user, and the screen attention degree determination unit is configured to determine the screen attention degree based on the facial expression of the user which is determined by the facial expression determination unit.

With the above structure, for example, when user's facial expression determined by the facial expression determination unit is smile, items in the relevance category having a high possibility of being selected by the user can be displayed in a display style allowing the user to easily select the items.

For example, it is possible that the screen attention degree determination unit further includes a speech obtaining unit configured to obtain speech, and the screen attention degree determination unit is configured to determine the screen attention degree based on detail of conversation of the user which is obtained as the speech by the speech obtaining unit.

With the above structure, for example, when detail of conversation includes laugh, items in the relevance category having a high possibility of being selected by the user can be displayed in a display style allowing the user to easily select the items.

For example, it is possible that the screen attention degree determination unit further includes a speech obtaining unit configured to obtain speech, and the screen attention degree determination unit is configured to determine the screen attention degree based on an excitement degree of conversation of the user which is obtained as the speech by the speech obtaining unit.

With the above structure, for example, when a sound volume of conversation which is larger than a predetermined value is kept for a predetermined time or more, an excitement degree of conversation is determined as high. In addition, when the excitement degree of conversation is high, items in the relevance category having a high possibility of being selected by the user can be displayed in a display style allowing the user to easily select the items.

For example, it is possible that the display control device further includes a user recognition unit configured to recognize the user existing in front of the screen of the display unit, wherein the screen attention degree determination unit further includes a friend information obtainment unit configured to obtain (a) a list of friends of the user and (b) content viewing information indicating pieces of content viewed by the friends, and the screen attention degree determination unit is configured to determine the screen attention degree as higher as a total number of friends who have viewed a piece of content currently displayed by the display unit is greater.

With the above structure, as the number of friends who have viewed the content currently displayed by the display unit is greater, in other words, if the content is more popular among the friends, items in the relevance category are displayed in a display style allowing the user to more easily select the items. The content which is popular among the user's friends is estimated as a piece of content which the user is also interested in. Therefore, there is a high possibility that the user will select items in the relevance category. In short, when many friends of the user have viewed the content, items having a possibility of being selected by the user can be displayed in a display style allowing the user to easily select the items.

For example, it is possible that the screen attention degree determination unit further includes a recommender obtainment unit configured to obtain information indicating a recommender of a piece of content displayed by the display unit, and the screen attention degree determination unit is configured to determine the screen attention degree as higher as a rank order of the recommender of the piece of content displayed by the display unit is higher.

With the above structure, as a rank order of a recommender of a piece of content displayed on the display unit is higher, items in the relevance category are displayed in a display style allowing the user to more easily select the items. It is supposed that a piece of content recommended by a recommender in a higher rank order is useful for the user. Therefore, there is a high possibility that the user will select the items in the relevance category. In other words, it is possible to display items related to a piece of content recommended by a recommender in a high rank order, in a display style allowing the user to easily select the items.

It is still further possible that the rank order of the recommender is higher as a total number of votes by viewers in a predetermined range is greater.

With the above structure, items related to a piece of content recommended by a recommender having more votes of viewers in a predetermined range can be displayed in a display style allowing the user to more easily select the items. For example, if the predetermined range is a group of viewers having similar preference to that of the user, items which the user prefer more can be displayed in a display style allowing the user to more easily select the items.

The above general and specific aspect may be implemented as a method, an integrated circuit, a computer program, and a computer-readable recording medium, such as a Compact Disc-Read Only Memory (CD-ROM), and may be implemented also as a desired combination of them.

The following describes embodiments in detail with reference to the drawings.

It should be noted that all the embodiments described below are general and specific examples of the present disclosure. Numerical values, shapes, materials, constituent elements, arrangement positions and the connection configuration of the constituent elements, steps, the order of the steps, and the like described in the following embodiments are merely examples. They are therefore not intended to limit the present disclosure. Furthermore, among the constituent elements in the following embodiments, constituent elements that are not described in independent claims that show the most generic concept of the present disclosure are described as elements constituting more desirable configurations.

Moreover, in the following description, the same reference numerals are assigned to identical structural elements. The identical structural elements share the same name and same function. Therefore, such identical structural elements are sometimes not described repeatedly.

[Structure]

FIG. 1A is a block diagram showing a functional structure of a display control device 1000 according to an embodiment. FIG. 1A shows main structural element of the display control device 1000.

The display control device 1000 is a television set. It should be noted that the display control device 1000 is not limited to a television set, but may be any other device capable of displaying video. For example, the display control device 1000 may be a tablet terminal or a smartphone. In the description, a piece of content means a piece of video content.

As shown in FIG. 1A, the display control device 1000 includes a display unit 100, a push information management unit 101, an involvement determination unit 110, a selection probability calculation unit 108, and a display style determination unit 109.

The display unit 100 is, for example, a Liquid Crystal Display (LCD) and displays pieces of content (videos).

Figure 1B:
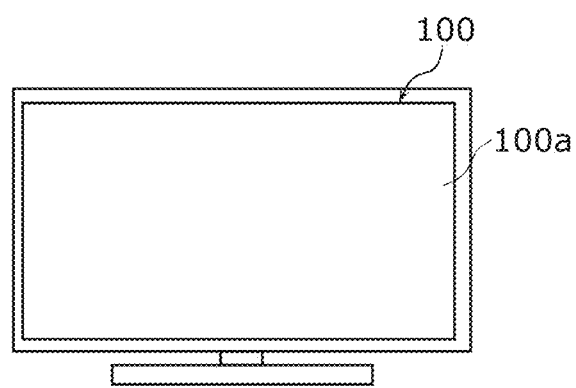
FIG. 1B is a diagram showing a structure of a display unit.

FIG. 1B is a diagram showing a structure of the display unit 100. The display unit 100 has a screen 100a. On the screen 100a, a piece of content (video) and the like is displayed.

It should be noted that the display unit 100 is not limited to a LCD but may be a Plasma Display Panel (PDP) or an Organic Light Emitting Display (OLED). The display unit 100 may be implemented to a structure that forms images on a surface such as a wall by using projection equipment.

The push information management unit 101, which will be described later, obtains push information. The push information is information distributed by a known push technique. The push information belongs to any one of a plurality of categories. The categories include, for example, a category of trend information (trend information category), a category of relevant information (relevance category), a category of notification information (notification information category), and the like. It should be noted that a category to which pieces of trend information belong is referred to also as a trend category, a category to which pieces of relevant information belong is referred to also as a relation category, and a category to which pieces of notification information belong is referred to also as a notification category.

Trend information is, for example, information that is a popular topic of conversation in a society, area, or the like. Relevant information is information related to a piece of content (a piece of video content) displayed by the display unit 100. Notification information, which will be described later in more detail, is information transmitted from an electrical device described later.

The push information management unit 101, for example, obtains push information distributed by a push information providing device (not shown) via a network, a broadcast network, or the like. The push information providing device is, for example, a server. Furthermore, the push information management unit 101 obtains push information transmitted from an electrical device 301 that will be described later.

It should be noted that the push information management unit 101 may obtain push information that is included in a piece of content which the display control device 1000 has obtained from the outside.

Furthermore, the push information management unit 101 manages pieces of obtained push information each belonging to any one of the categories.

The involvement determination unit 110 calculates an involvement between a user and a piece of push information belonging to any one of the categories.

The selection probability calculation unit 108 calculates a selection probability that is a probability of being selected by the user, for each of the categories each including pieces of push information, which will be described later in more detail.

The display style determination unit 109 sets a display style allowing the user to more easily select (more easily access) pieces of push information in a category having a higher selection probability from among the categories each including pieces of push information. This will be described later in more detail.

Next, steps in processing performed by the display control device 1000 shown in FIG. 1A are briefly described.

Figure 2:
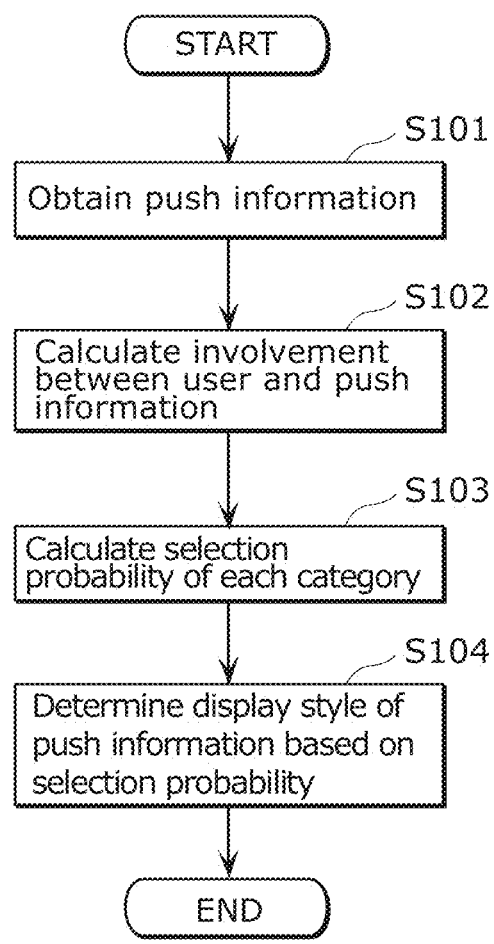
FIG. 2 is a flowchart of display control processing.

FIG. 2 is a flowchart of display control processing according to the present embodiment.

First, the push information management unit 101 obtains pieces of push information (S101). Then, the involvement determination unit 110 calculates an involvement between the user and each of the pieces of push information belonging to each of the categories (S102). Next, based on the calculated involvement, the involvement determination unit 110 calculates a selection probability for each of the categories each including pieces of push information (S103). Based on the calculated selection probability, the display style determination unit 109 determines a display style for pieces of push information in each of the categories (S104).

Figure 3:
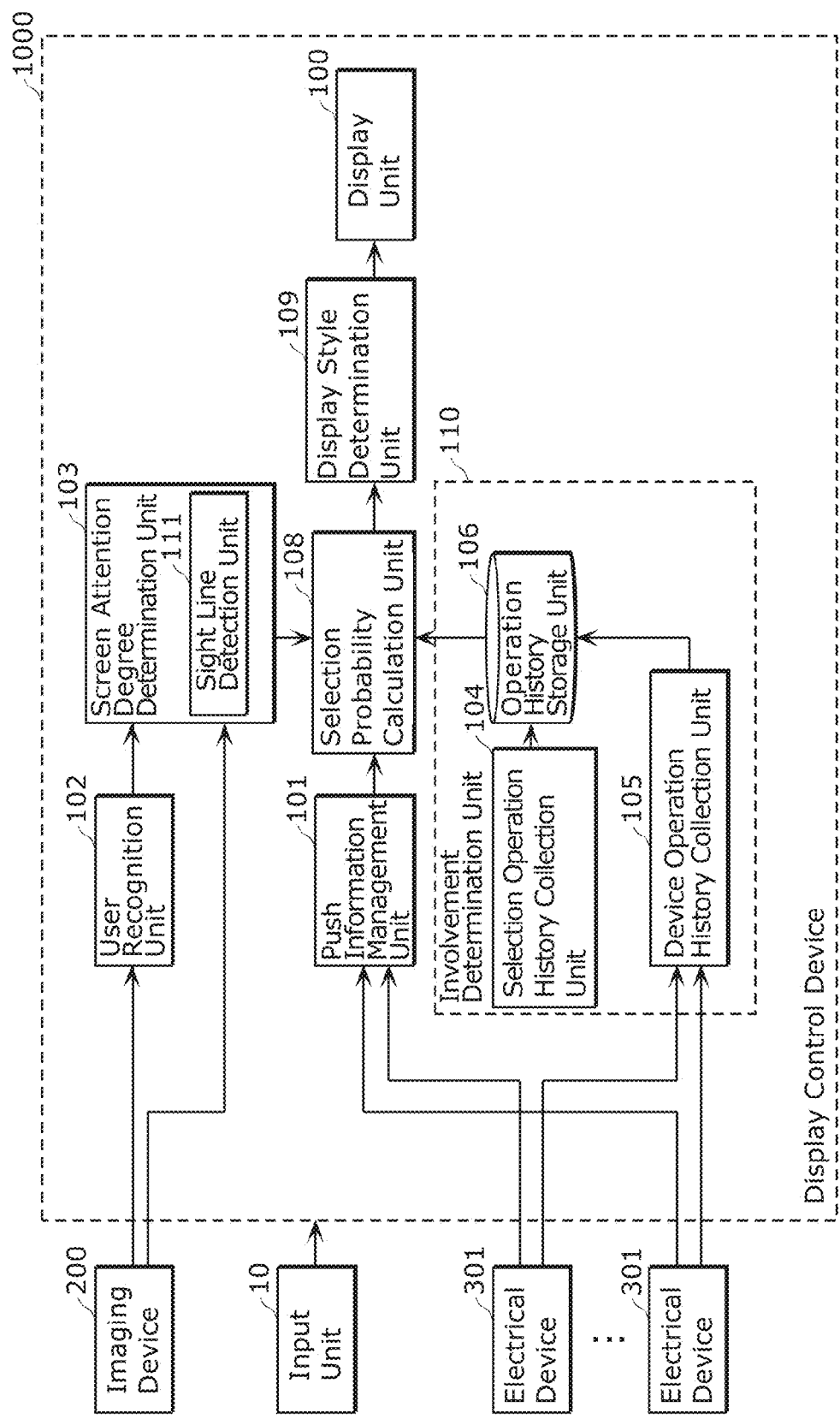
FIG. 3 is a block diagram showing the functional structure of the display control device in more detail.

FIG. 3 is a block diagram showing the functional structure of the display control device 1000 according to the present embodiment in more detail.

The display control device 1000 is operated by an input unit 10 via wireless communication or the like. The input unit 10 is a device for operating the display control device 1000. The input unit 10 is a remote controller. It should be noted that the input unit 10 is not limited to a remote controller, but may be, for example, a mobile terminal such as a smartphone or a tablet terminal. It should also be noted that the display control device 1000 and the input unit 10 are shown as independent different devices in FIG. 3, but of course, the display control device 1000 may have the function of the input unit 10. For example, if a tablet terminal or a smartphone is the display control device 1000, the tablet terminal or the smartphone may have the function of the input unit 10.

The display control device 1000 communicates with at least one electrical device 301. More specifically, as shown in FIG. 3, the display control device 1000 is connected to one or more electrical devices 301 via a network. The network is a wired network using a LAN cable or the like, or a wireless network using a wireless LAN.

The electrical devices 301 are, for example, network appliances such as a washing machine, a refrigerator, an air conditioner, an air purification, a microwave, and a BD recorder.

Each of such electrical devices 301 transmits device operation history information indicating a history of operation of the electrical device 301 by a user, to the display control device 1000.

Furthermore, such an electrical device 301 transmits a piece of push information belonging to a notification information category, to the push information management unit 101. In other words, the electrical device 301 is a source device that transmits notification information. In this case, the push information is, for example, information indicating an operation state or the like of the electrical device 301.

Here, the electrical device 301 is, for example, assumed to be a washing machine. In this case, the push information is, for example, information for notifying that washing is completed.

The display control device 1000 further includes a user recognition unit 102 and a screen attention degree determination unit 103.

The user recognition unit 102 obtains, from an imaging device (camera) 200, an image showing a subject imaged by the imaging device 200. Hereinafter, an image captured by the imaging device 200 is referred to also as a captured image.

The user recognition unit 102 recognizes a user in front of the screen 100a of the display unit 100, based on the captured image. This will be described later in more detail. It should be noted that the user recognition may be performed by a mobile terminal that the user has.

The screen attention degree determination unit 103 determines a screen attention degree indicating how much the recognized user pays attention to the screen 100a of the display unit 100. This will be described later in more detail.

The involvement determination unit 110 includes a selection operation history collection unit 104, a device operation history collection unit 105, and an operation history storage unit 106.

The selection operation history collection unit 104 collects pieces of selection operation history information each indicating a history of selection of a certain category by the user using the input unit 10 or the like from among the categories each including pieces of push information. For example, the selection operation history information indicates a history of selection of the notification information category from among the categories each including pieces of push information. Then, the selection operation history collection unit 104 stores the collected pieces of selection operation history information into the operation history storage unit 106.

The device operation history collection unit 105 collects pieces of the above-described device operation history information from each of the electrical devices 301. Then, the device operation history collection unit 105 stores the collected pieces of device operation history information into the operation history storage unit 106.

The operation history storage unit 106 holds (stores) the pieces of selection operation history information and the pieces of device operation history information.

[Processing]

The following describes steps in processing performed by the display control device 1000 having the structure as shown in FIG. 3.

Figure 4:
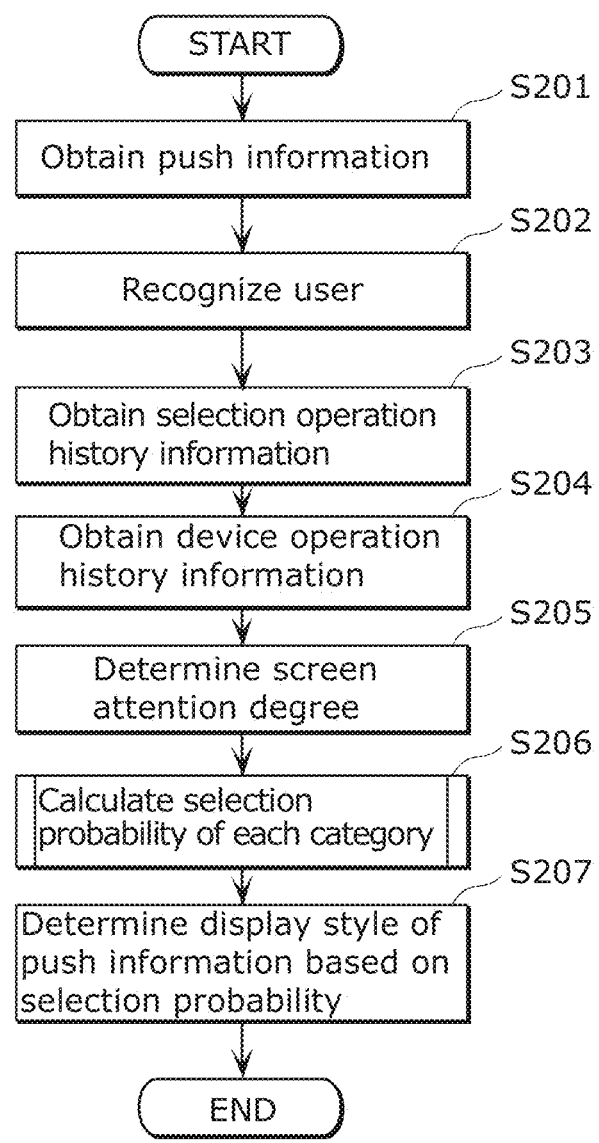
FIG. 4 is a flowchart showing the display control processing in more detail.

FIG. 4 is a flowchart showing display control processing according to the present embodiment in detail. Here, it is assumed that the user is in front of the screen 100a of the display unit 100. Under the assumption, a captured image shows the user.

First, the push information management unit 101 obtains pieces of push information (S201). Then, the user recognition unit 102 obtains the captured image showing the user, from the imaging device 200. By known face recognition processing, for example, the user recognition unit 102 compares a user's face in the obtained captured image to face information previously registered in a database, and thereby recognizes the user. As a result, the user recognition unit 102 recognizes the user in front of the screen 100a of the display unit 100 (S202).

Subsequently, the selection probability calculation unit 108 obtains the above-described pieces of selection operation history information which are stored in the operation history storage unit 106 for the recognized user (S203). Furthermore, the selection probability calculation unit 108 obtains the above-described pieces of device operation history information which are stored in the operation history storage unit 106 for the recognized user (S204).

Subsequently, the screen attention degree determination unit 103 determines a screen attention degree, which will be described later in more detail (S205). The screen attention degree determination unit 103 provides the determined screen attention degree to the selection probability calculation unit 108. The selection probability calculation unit 108 thereby obtains the screen attention degree.

Then, the selection probability calculation unit 108 determines, for each of the pieces of push information, a selection probability for each of the categories, based on the obtained screen attention degree and the pieces of selection operation history information (S206). More specifically, the selection probability calculation unit 108 calculates a selection probability for each of the categories, based on the pieces of selection history information obtained at the selection history information obtaining step (S203), the pieces of device operation history information obtained at the device operation history information obtaining step (S204), and the screen attention degree obtained at the screen attention degree determining step (S205).

Although details of the step (S206) for calculating a selection probability for each of the categories will be described later, the selection probability calculation unit 108 calculates, for example, a higher selection probability for the notification information category if the screen attention degree is low and the pieces of selection operation history information indicate that the notification information category has been selected predetermined times or more.

It should be noted that the selection probability calculation unit 108 may calculate the selection probability based on the obtained screen attention degree, the obtained device operation history information, and the obtained selection operation history information.

Here, it is assumed that the obtained screen attention degree is equal to or lower than a predetermined value. It is also assumed that the obtained device operation history information indicates that an electrical device 301 corresponding to the device operation history information has not been operated for predetermined days or more. Under the assumption, for example, the selection probability calculation unit 108 calculates the highest selection probability for the trend category from among the categories each including pieces of push information.

Next, the selection probability calculation unit 108 transmits the calculated selection probabilities to the display style determination unit 109. The display style determination unit 109 thereby obtains the selection probabilities. Based on the obtained selection probabilities, the display style determination unit 109 determines a display style of push information for each of the categories (S207). In other words, a category having a higher selection probability is determined to be displayed in a display style allowing the user to more easily select pieces of push information in the category, and the category is displayed on the display unit 100 in the determined display style.

Then, the display style determination unit 109 controls the display unit 100 to display the pieces of push information in the determined display style. The display unit 100 thereby displays the pieces of push information in the determined display style.

For example, according to a display style determined at the display style determination step (Step S207), the display style determination unit 109 controls the display unit 100 to display a display region for pieces of push information in a category having a maximum selection probability from among the categories each including pieces of push information, so that the display region regarding the category having the maximum selection probability is larger than any other display regions regarding the other categories.

As described above, the display control device 1000 according to the present disclosure controls a display unit 100 having a screen to perform displaying, including: a management unit 101 that manages items each belonging to any one of categories; a screen attention degree determination unit 103 that determines a screen attention degree indicating how much a user pays attention to the screen of the display unit; a selection operation history collection unit 104 that collects selection operation history information indicating a history of selection of each of the categories; a selection probability calculation unit 108 that calculates a selection probability of being selected by the user, for each of the categories based on the screen attention degree and the selection operation history information; and a display style determination unit 109 that (i) determines a display style allowing the user to more easily select an item in a category having a higher selection probability among the categories, and (ii) causes the display unit 100 to display the item in the determined display style. The categories include a relevance category that is a category including items related to a piece of content displayed on the screen. The selection probability calculation unit 108 is configured to: calculate a selection probability of the relevance category in a case where the screen attention degree is a first attention degree to be higher than a selection probability of the relevance category in a case where the screen attention degree is a second attention degree that is lower than the first attention degree; and calculate, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

With the above structure, the display control device 1000 according to the present embodiment allows the user to easily select pieces of push information in a category having a higher probability of being selected by the user, from among categories each including pieces of push information. In other words, the display control device 1000 according to the present embodiment can control display to allow the user to easily access pieces of push information in a category having a high probability of being selected by the user from among pieces of push information in various categories. In other words, the display control device 1000 can display pieces of push information having a high possibility of being selected by the user.

[Screen Attention Degree Determination]

Next, the above-described processing performed by the display control device 1000 is described in more detail.

First, from among the steps included in the display control processing of FIG. 4, the screen attention degree determination step (Step S205) is described in more detail.

The screen attention degree determination unit 103 determines a screen attention degree based on a user's sight line direction detected by a sight line detection unit 111 that will be described later. The user is the user recognized by the user recognition unit 102 at the user recognition step (Step S202).

More specifically, for example, the screen attention degree determination unit 103 determines a higher (greater) screen attention degree for a longer duration of a screen attention state. The screen attention state is a state where a user's sight line direction detected at a step (S509) described later is from the user to the screen 100a of the display unit 100. In short, the screen attention state is a state where the user is viewing any one of the regions in the screen 100a.

[Selection Probability Calculation]

Next, from among the steps included in the display control processing of FIG. 4, the category selection probability calculation step (S206) is described in more detail.

Figure 5:
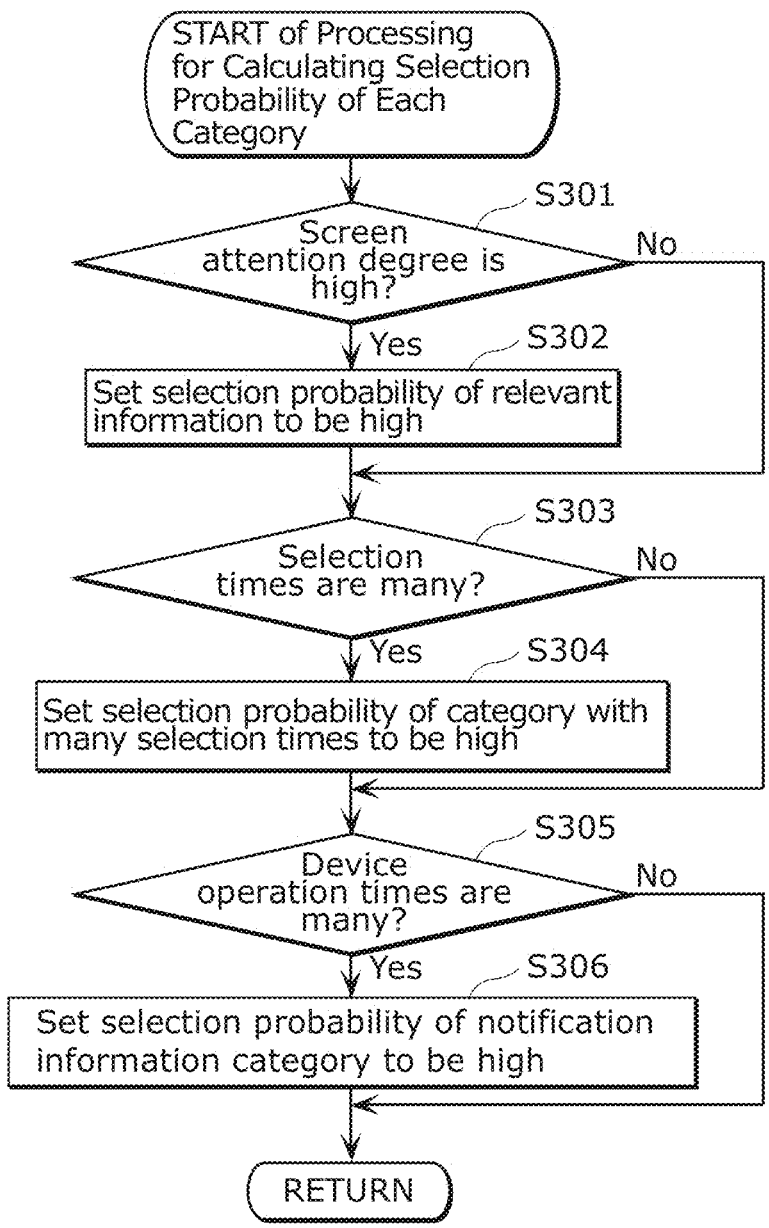
FIG. 5 is a flowchart showing processing for calculating a selection probability of each category in more detail.

FIG. 5 is a flowchart showing the step (S206) of calculating a selection probability for each of the categories in more detail.

First, the selection probability calculation unit 108 determines whether or not the screen attention degree determined at the screen attention degree determination step (S205) is high (S301). Here, "the screen attention degree . . . is high" means, for example, that a screen attention state per unit time is 80% or more.

If it is determined that the screen attention degree is high (Yes at S301), then the selection probability calculation unit 108 sets a selection probability of pieces of relevant information to be high (S302). More specifically, if the user is concentrated on viewing the screen 100a, in other words, if the user is interested in a piece of content displayed on the screen 100a, then the selection probability calculation unit 108 sets a high selection probability for the relevance category including pieces of push information related to the content.

Next, after the step (S302) for setting the high selection probability for the pieces of relevant information, and if it is determined that the screen attention degree is not high (No at S301), then the selection probability calculation unit 108 determines, for each of the categories, whether or not the target category has been selected many times (in other words, whether or not a total number of selection times the target category has been selected is a large number), based on the pieces of selection operation history information stored in the operation history storage unit 106 (S303). Here, "has been selected many times" means that the number of times the target category has been selected exceeds a predetermined threshold (for example, ten times).

If it is determined that the target category has been selected many times (Yes at S303), then the selection probability calculation unit 108 sets a high selection probability for the target category determined as having been selected many times (S304). It should be noted that the selection probability calculation unit 108 may set a high selection probability for a category based on the selection operation history information, if the number of the selection times per unit time (for example, last three days) exceeds a predetermined number of times (for example, five times). It is also possible to set a higher selection probability for a category having a higher frequency of being selected.

Next, after the step (S304) for setting a high selection probability for a category having been selected many times, and if it is determined that each of the categories has not been selected many times (No at S303), then the selection probability calculation unit 108 determines, based on the pieces of device operation history information stored in the operation history storage unit 106, whether or not each of the electrical devices 301 has been operated many times (in other words, whether or not a total number of times each of the electrical devices 301 has been operated is a large number) (S305). Here, "has been operated many times" means that a number of times each of the electrical devices 301 has been operated exceeds a predetermined threshold (for example, ten times).

If it is determined that a target electrical device 301 has been operated many times (Yes at S305), then the selection probability calculation unit 108 sets a high selection probability for pieces of notification information (S306). It should be noted that the selection probability calculation unit 108 may set a high selection probability for the pieces of notification information based on the operation history information, if a number of times per unit time the target electrical device 301 has been operated (for example, last one day) exceeds a predetermined number of times (for example, one time). Furthermore, it is possible that, if there is an electrical device 301 that has been frequently operated, the pieces of notification information are assign with a higher selection probability. It is also possible that, as the frequency is higher, the selection probability of the pieces of notification information is higher.

The above-described processing is details of the step (S206) for calculating a selection probability for each of the categories. As described above, the selection probability calculation unit 108 (a) calculates a selection probability of the pieces of relevant information in the case of a high screen attention degree to be higher than a selection probability of the pieces of relevant information in the case of a low screen attention degree, and (b) calculates a selection probability of each of categories indicated by selection operation history information as having been selected many times to be higher than a selection probability of each of categories not having been selected many times. It should be noted that "the case of a high screen attention degree" is one example of "a case where the screen attention degree is a first attention degree" according to the present disclosure, and "the case of a low screen attention degree" is one example of a case where the screen attention degree is the "second attention degree" according to the present disclosure. Furthermore, "having been selected many times" is one example of "a case where a total number of selection times the each of the categories has been selected is a first number" according to the present disclosure, and "not having been selected many times" is one example of a case where the total number of the selection times is a "second number" according to the present disclosure.

Furthermore, the display control device 1000 communicates with at least one electrical device 301. The plurality of categories include a notification category that is a category including items notified from the electrical device 301. The display control device 1000 further includes a device operation history collection unit 105 that collects pieces of device operation history information indicating a history of operation of the electrical device 301 by the user. The selection probability calculation unit 108 further calculates a selection probability of the notification category in the case where the device operation history information indicates that the electrical device 301 has been operated many times, to be higher than a selection probability of the notification category in the case of not having been operated many times. Here, "has been operated many times" is one example of "a case where a total number of operation times the at least one electrical device has been operated is a third number" according to the present disclosure, and "not having been operated many times" is one example of a case where the total number of the operation times is a "fourth time" according to the present disclosure.

Thereby, the selection probability calculation unit 108 can (a) set a high selection probability for the relevance category including pieces of push information related to a piece of content displayed on the screen 100a when the screen attention degree is high, (b) set a high selection probability for a category (for example, trend information category) having been selected many times (the number of selection times is great) when there is such a category having been selected many times, and (c) set a high selection probability for the notification category including pieces of push information transmitted form the electrical device 301 when the electrical device 301 has been operated many times. Therefore, the display control device 1000 according to the present embodiment causes, in the following step (S207) for determining a display style, the display unit 100 to display pieces of push information in a category having a higher selection probability in a display style allowing the user to more easily select the pieces of push information. As a result, it is possible to display pieces of push information having a high possibility of being selected by the user.

It should be noted that it has been described above that the screen attention degree is determined high when a screen attention state per unit time is 80% or more, but the state where the screen attention degree is determined high is not limited to this state. It may be the state where the screen attention state per unit time is 50% or more, or 90% or more.

Moreover, the selection probability calculation unit 108 may calculate a higher selection probability for the related information category as a screen attention degree is higher. For example, it is also possible that, when the screen attention degree is proportional to a rate of a screen attention state per unit time, a selection probability of the pieces of relevant information is calculated higher as a screen attention state is higher.

Moreover, the selection probability calculation unit 108 may calculate a higher selection probability for a category having a larger number of selection times indicated in the selection operation history information. For example, when the number of times trend information has been selected is three times, the number of times relevant information has been selected is fifteen times, and the number of times notification information has been selected is ten times, the selection probability calculation unit 108 may calculate higher selection probabilities in an order of the relevance category, the notification information category, and the trend information category. Likewise, it is possible to set a higher selection probability for the notification category, as a number of operation times indicated in the device operation history information is larger.

Moreover, the selection probability calculation unit 108 may calculate the number of selection times per unit time based on the number of selection times indicated in the selection operation history information, and set a higher selection probability for a category having a larger number of selection times per unit time that has been calculated. In other words, it is possible to calculate a higher selection probability for a category having being selected more. Likewise, it is possible to calculate the number of operation times per unit time based on the number of operation times indicated by the device operation history information, and calculate a higher selection probability for the notification category when the calculated number of operation times per unit time is larger.

Furthermore, the selection probability calculation unit 108 may calculate a higher selection probability for pieces of push information transmitted from an electrical device 301 having been operated more times, based on the number of operation times each of the electrical devices 301 has been operated which are indicated in the device operation history information.

Furthermore, it is also possible that each piece of push information belonging to the notification category is associates with an announcement intensity, and that the selection probability calculation unit 108 may calculate a selection probability of the notification category in the case where an announcement intensity of a piece of push information which is obtained by the push information management unit 101 is the first intensity, to be higher than a selection probability of the notification category in the case where an announcement intensity of a piece of push information is the second intensity lower than the first intensity. Here, the announcement intensity of a piece of push information indicates, for example, a degree of requesting the user to respond. For example, an announcement intensity in the case where the electrical device 301 is a microwave and a piece of push information of the microwave indicates that heating is completed is higher than an announcement intensity in the case where the electrical device 301 is an air purification and a piece of push information of the air purification indicates that operation is completed. Furthermore, for example, it is possible that the first intensity is higher than a predetermined threshold, and the second intensity is lower than the threshold. Furthermore, the selection probability calculation unit 108 may calculate a higher selection probability for the notification category as an announcement intensity of a piece of push information is higher.

Thereby, when the user is requested to immediately operate the electrical device 301, pieces of push information as notification information can be displayed on the screen 100*a* in a display style allowing the user to easily select the pieces of push information. This increases a possibility that the user will select the piece of push information of the notification information.

Furthermore, the selection probability calculation unit 108 may calculate a selection probability for each of the categories, by weighting each of (a) a selection probability of the relevance category which is calculated based on an screen attention degree, (b) a selection probability of each of the categories which is calculated based on the selection operation history information, and (c) a selection probability of the notification category which is calculated based on the device operation history information. In other words, for example, it is possible to weight, at maximum, a selection probability of the relevance category which is calculated based on a screen attention degree, and weight, at minimum, a selection probability of each of categories which is calculated based on the selection operation history information. In this case, when (a) a screen attention degree is high, (b) a number of operation times indicated in the device operation history information is large, and (c) only the trend information category has a large number of selection times indicated in the selection history information, then the selection probabilities calculated by the selection probability calculation unit 108 are gradually lower in an order of the relevance category, the notification information category, and the trend information category.

It is also possible not to perform the above-described weighting, but to calculate an eventual selection probability for each of the categories by a simple addition operation.

[User's Sight Line Direction]

Next, the processing for detecting a user's sight line direction is described in more detail.

The screen attention degree determination unit 103 has a sight line detection unit 111 that detects a sight line direction of the user recognized by the user recognition unit 102. The following describes in more detail the processing performed by the sight line detection unit 111 to detecting a sight line direction.

The sight line direction is calculated based on a combination of a direction of facing a user's face (hereinafter, referred to as a "face direction") and a direction of a black eye part of the user's eye (hereinafter, referred to as a "black eye direction") with respect to the user's face direction. Therefore, the sight line detection unit 111 first estimates a three-dimensional face direction of a person. Next, the sight line detection unit 111 estimates a black eye direction. Finally, the sight line detection unit 111 calculates a sight line direction by integrating the face direction and the black eye direction.

It should be noted that the sight line detection unit 111 does not need to calculate a sight line direction always based on a combination of a face direction and a black eye direction. For example, the sight line detection unit 111 may calculate a sight line direction based on an eyeball center and an iris (black eye) center. In other words, the sight line detection unit 111 may calculate, as a sight line direction, a three-dimensional vector between a three-dimensional position of an eyeball center and a three-dimensional position of an iris (black eye) center.

Figure 6A:
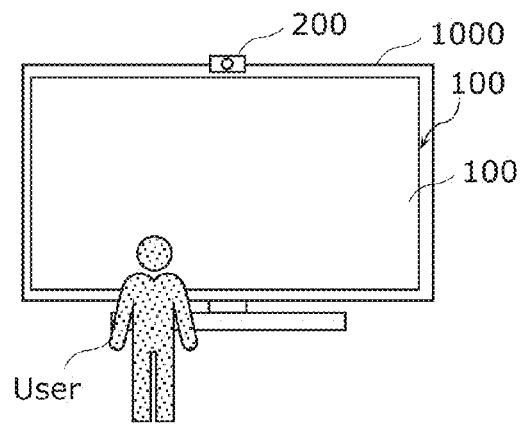
FIG. 6A is a diagram for explaining an example of an arrangement of an imaging device.
Figure 6B:
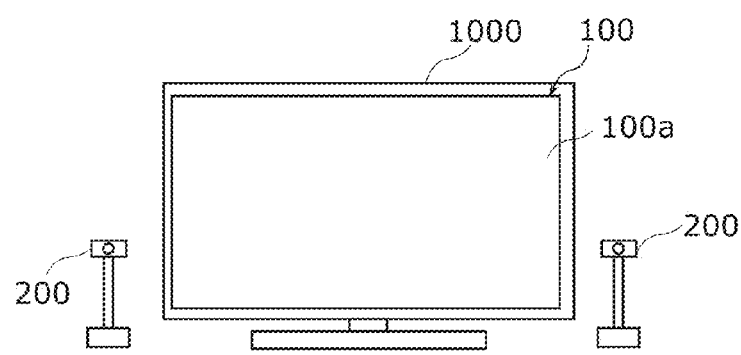
FIG. 6B is a diagram for explaining another example of an arrangement of the imaging device.
Figure 6C:
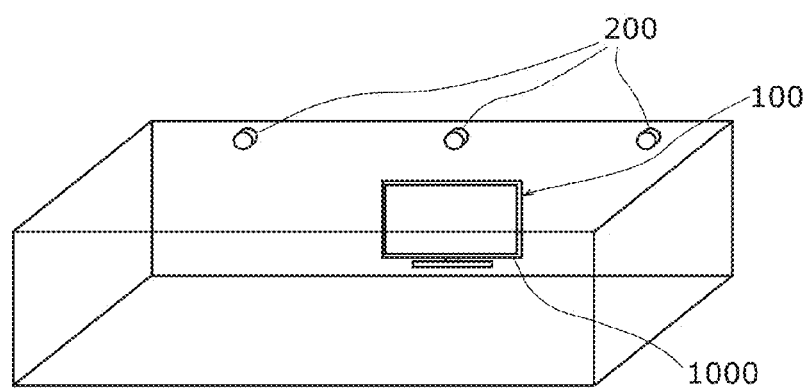
FIG. 6C is a diagram for explaining still another example of an arrangement of the imaging device.

Each of FIGS. 6A, 6B, and 6C is a diagram showing an arrangement of an imaging device 200 that captures image to be used in the sight line direction detection processing according to the present embodiment. As shown in FIGS. 6A, 6B, and 6C, the imaging device 200 is provided near the screen 100*a* of the display unit 100 to capture the user in front of the screen 100*a*. For example, the imaging device 200 is provided on the display unit 100 as shown in FIG. 6A. Furthermore, as shown in FIG. 6B or 6C, the imaging devices 200 may be provided at positions far from the display unit 100.

Figure 7:
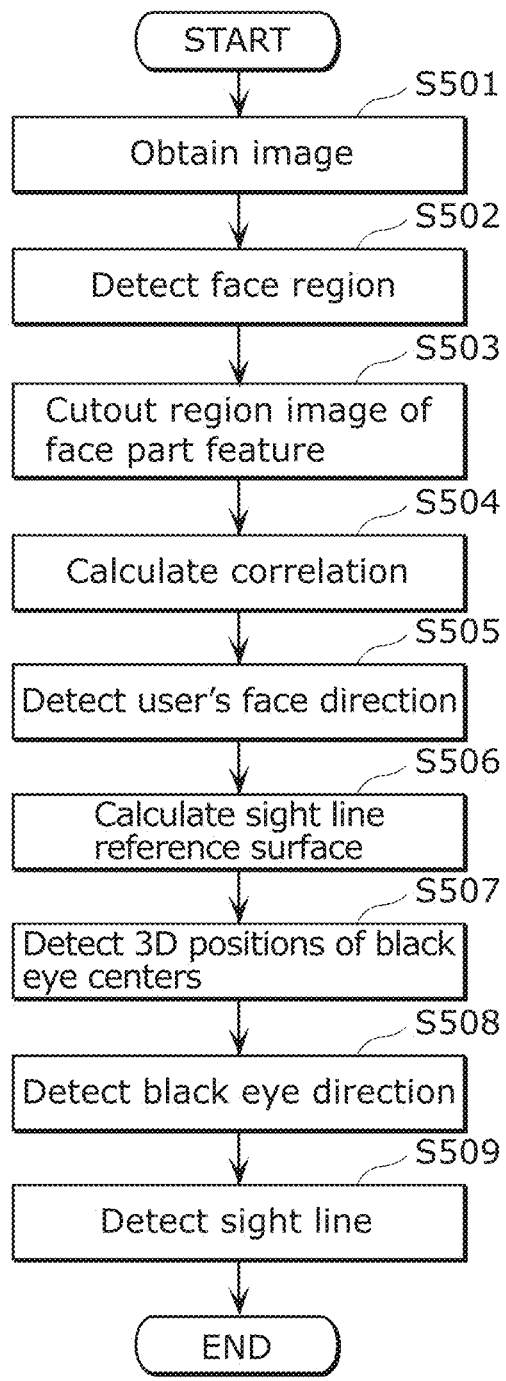
FIG. 7 is a flowchart of sight line direction processing.

FIG. 7 is a flowchart of showing the flow of the sight line direction processing according to the present disclosure.

First, the sight line detection unit 111 obtains, from the imaging device 200, an image generated by the imaging device 200 imaging the user in front of (facing) the screen 100*a* of the screen 100*a* (S501). Subsequently, the sight line detection unit 111 detects a face region from the obtained image (S502). Next, the sight line detection unit 111 fits, to detected face region, regions of face part features corresponding to respective reference face directions, and cuts out region images of the respective face part features (S503).

Then, the sight line detection unit 111 calculates a correlation between each of the cutout region images and a previously-stored template image (S504). Subsequently, the sight line detection unit 111 executes weighting addition on an angle of each of the reference face direction according to a ratio of the calculated correlation, and thereby detects the result as a face direction of a user corresponding to the detected face region (S505).

Figure 8:
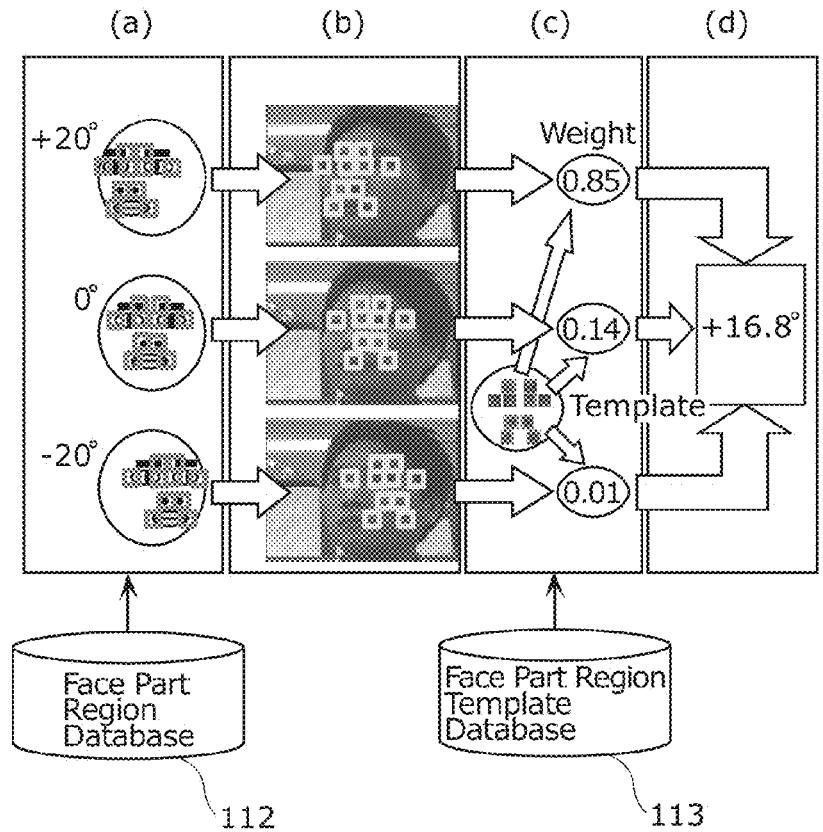
FIG. 8 is a diagram for explaining processing for detecting a face direction in the sight line direction processing.

FIG. 8 is a diagram for explaining the step (S505) for detecting a face direction in the sight line direction processing according to the present embodiment in more detail.

The sight line detection unit 111, as shown in (a) of FIG. 8, reads the regions of the face part features corresponding to the respective reference face directions from a face part region database (database) 112 that holds the regions. Then, the sight line detection unit 111, as shown in (b) of FIG. 8, fits each of the regions of the face part features to the face region of the captured image for each of the reference face directions, and cuts out a region image of a target face part feature for each of the reference face directions.

Then, the sight line detection unit 111, as shown in (c) of FIG. 8, calculates, for each of the reference face directions, a correlation between a target cutout region image and a template image stored in a face part region template database (database) 113. In addition, the sight line detection unit 111 calculates a weight of each of the reference face directions according to a degree of a correlation calculated in the above manner. For example, the sight line detection unit 111 calculates, as a weight, a ratio of (a) a correlation of each of reference face directions to (b) a sum of correlations of the reference face directions.

Next, the sight line detection unit 111, as shown in (d) of FIG. 8, calculates a sum of values each generated by multiplying a corresponding one of the angles indicated by the respective reference face directions by a corresponding calculated weight, so as to detect the sum as a user's face direction.

In the example of (d) of FIG. 8, a weight for a reference face direction +20 degrees is "0.85", a weight for a front direction is "0.14", a weight for −20 degrees is "0.01". Therefore, the sight line detection unit 111 detects a face direction as 16.8 degrees (=20×0.85+0.014+(−20)×0.01).

It should be noted in the present embodiment that the sight line detection unit 111 calculates a correlation from a region image of a face part feature, but the present disclosure is not limited to the above. For example, the sight line detection unit 111 may calculate a correlation from the image of the entire face region.

As another method of detecting a face direction, it is possible to detect face part features, such as eyes, a nose, and a mouth, from a face image and calculate a face direction based on positional relationships among the face part features.

One of the methods of calculating a face direction based on positional relationships among face part features is a method of matching prepared three-dimensional models of face part features to face part features captured by a single camera by rotating image or increasing/decreasing a size of the image to find the best matching, thereby calculating a face direction based on an amount of rotation of the three-dimensional models.

Furthermore, another method of calculating a face direction based on positional relationships among face part features is a method of calculating, by using a principal of stereo disparity for images captured by left and right cameras, a three-dimensional position of each of face part features based on a positional difference of the target face part feature between the two images captured by the two cameras, and thereby calculating a face direction based on positional relationships among the face part features. More specifically, for example, there is a method of detecting, as a face direction, a normal direction of a plane surface defined by three-dimensional coordinates of both eyes and a mouth. As a method of detecting a face direction, the above methods are also possible.

Referring back to the flowchart of FIG. 7, the description continues.

The sight line detection unit 111 detects three-dimensional positions of inner corners of user's left and right eyes from a stereo image captured by the imaging device 200, and calculates a sight line reference surface from the detected three-dimensional positions (S506). Sequentially, the sight line detection unit 111 detects three-dimensional positions of black eye centers of the user's left and right eyes, from the stereo image captured by the imaging device 200 (S507). Then, the sight line detection unit 111 detects a black eye direction based on the sight line reference surface and the three-dimensional positions of the black eye centers of the left and right eyes (S508).

Then, the sight line detection unit 111 detects a user's sight line direction based on the detected face direction and the black eye direction of the user (S509).

Figure 9:
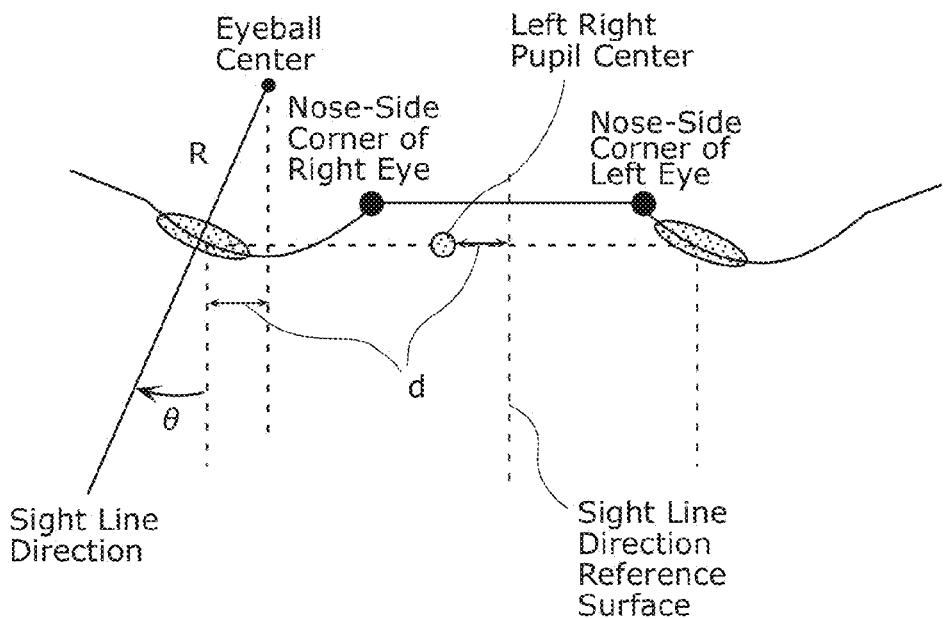
FIG. 9 is a diagram for explaining calculation of a sight line reference surface.
Figure 10:
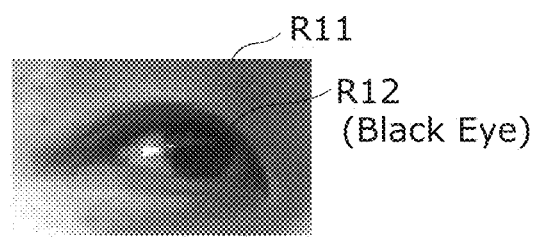
FIG. 10 is a diagram for explaining detection of a black eye center.
Figure 11:
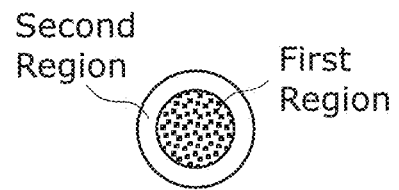
FIG. 11 is a diagram for explaining detection of a black eye center.

Next, the method of detecting a black eye direction is described in more detail with references to FIGS. 9 to 11.

According to the present embodiment, the sight line detection unit 111 first calculates a sight line reference surface. Subsequently, the sight line detection unit 111 detects three-dimensional positions of black eye centers. Then, finally, the sight line detection unit 111 detects a black eye direction.

First, the calculation of a sight line reference surface is described.

FIG. 9 is a diagram for explaining the calculation of a sight line reference surface according to the present embodiment.

The sight line reference surface is a surface used as a reference in detecting a black eye direction. The sight line reference surface is equivalent to a bilaterally symmetric surface of a face as shown in FIG. 9. It should be noted that positions of inner corners of eyes are less likely to change due to facial expression and to cause detection errors, in comparison to the other face parts such as outside corners of eyes, corners of a mouth, and eyebrows. Therefore, the sight line detection unit 111 calculates a sight line reference surface that is a bilaterally symmetric surface of the face based on three-dimensional positions of inner corners of eyes.

More specifically, the sight line detection unit 111 detects regions of inner corners of left and right eyes by using a face detection module and a face part detection module, for each of two images (stereo image) captured by the imaging device 200 that is a stereo camera. Then, the sight line detection unit 111 measures three-dimensional positions of the respective inner corners of left and right eyes, based on a difference (disparity) between images of the detected regions of the inner corners of eyes. Furthermore, the sight line detection unit 111, as shown in FIG. 9, calculates, as a sight line reference surface, a perpendicular bisector surface defined by a line segment having ends which are the detected three-dimensional positions of the inner corners of left and right eyes.

Next, the detection of black eye centers is described.

Each of FIGS. 10 and 11 is a diagram for explaining the detection of black eye centers according to the present embodiment.

Light is propagated from a subject, then passes through a pupil to arrive a retina where the light is converted into electrical signals. The electrical signals are provided to a brain, so that a human can visually recognize the subject. Therefore, a sight line direction can be detected based on positions of pupils. However, irises of Japanese people are black or brown which makes it difficult to distinguish a pupil from an iris in image processing. Therefore, according to the present disclosure, based on the observation that a pupil enter is almost the same as a black eye center (including both pupil and iris), the sight line detection unit 111 detects a black eye center in detecting a black eye direction.

The sight line detection unit 111 first detects a position of an outside corner and a position of an inner corner of a target eye from a captured image. Then, the sight line detection unit 111 detects, as a black eye region, a region R12 as shown in FIG. 10 which has lower luminance from a region R11 including the outside corner and the inner corner of the eye. More specifically, for example, the sight line detection unit 111 detects, as a black eye region, a region which has luminance equal to or lower than a predetermined threshold and is larger than a predetermines size.

Next, the sight line detection unit 111 sets a black eye detection filter including a first region and a second region as shown in FIG. 11, to an arbitrary position in the black eye region. Then, the sight line detection unit 111 determines a position of the black eye detection filter to maximize an inter-region dispersion between luminance of pixels in the first region and luminance of pixels in the second region. Then, the sight line detection unit 111 sets the determined position as a black eye center. Finally, in the same manner as described above, the sight line detection unit 111 detects a three-dimensional position of the black eye center based on a positional difference of the black eye center between two images in a stereo image.

Furthermore, the detection of a black eye direction is described.

The sight line detection unit 111 detects a black eye direction based on the calculated sight line reference surface and the detected three-dimensional positions of the black eye centers of the both eyes. It is known that diameters of eyeballs of adult humans are almost consistent from person to person. For example, diameters of eyeballs of Japanese people are approximately 24 mm. Therefore, if a position of a black eye center when a user faces in a direction as a reference (for example, the front) is known, a displacement from the position to a current position of a black eye center is determined and then converted into a black eye direction.

When the user faces the font, a middle point of black eye centers of left and right eyes is at the center of the face, in other words, the middle point exists on the sight line reference surface. Therefore, in the consideration of the above observation, the sight line detection unit 111 calculates a distance between the middle point of the black eye centers of left and right eyes and the sight line reference surface, and thereby detect a black eye direction based on the distance.

More specifically, the sight line detection unit 111 detects, as a black eye direction, a rotation angle θ of a horizontal direction with respect to a face direction as presented in Equation 1, by using (a) an eyeball radius R and (b) a distance d between (b1) a middle point of a line segment connecting and the black eye centers of left and right eyes and (b2) a sight line reference surface.

[Math. 1]

$$\theta = \sin^{-1}\left(\frac{d}{R}\right) \quad \text{(Equation 1)}$$

As described above, the sight line detection unit 111 detects a black eye direction by using the sight line reference surface and the three-dimensional positions of black eye centers. Then, the sight line detection unit 111 detects a user's sight line direction in a real space by using the detected face direction and the black eye direction.

As described above, the screen attention degree determination unit 103 according to the present embodiment includes the sight line detection unit 111 that detects a user's sight line direction, and the screen attention degree determination unit 103 determines the screen attention degree based on the sight line direction detected by the sight line detection unit 111. Thereby, for example, when the user's sight line direction is from the user to the screen, it is determined that the screen attention degree is high.

It should be noted that methods of detecting a sight line direction include other various methods such as corneal reflection method, Electrooculography (EOG) method, search-coil method, and sclera reflection method. Therefore, the sight line detection unit 111 does not need to always use the previously-described method to detect a sight line direction. For example, the sight line detection unit 111 may detect a sight line direction by corneal reflection method.

The corneal reflection method is a technique of measuring movements of an eyeball based on a position of a corneal reflection image (Purkinje image) that is seen bright when point light source lighting is irradiate on a corneal. Since the rotation center of an eyeball does not match the center of convex of a corneal, when a corneal is regarded as a convex mirror and a reflection point of a light source is collected by a convex lens or the light, the collected light point moves according to rotation of the eyeball. Images of the point are captured by an imaging device to measure movements of the eyeball.

[Other Examples of Screen Attention Degree Determination]

It should be noted that it has been described above that the screen attention degree determination unit 103 determines a screen attention degree based on a user's sight line direction in a real space at the screen attention degree determination step (S205), but the method for the screen attention degree determination is not limited to the above.

For example, the screen attention degree determination unit 103 may include a facial expression determination unit that determines a facial expression of a user. In this case, the screen attention degree determination unit 103 determines a screen attention degree based on a user's facial expression determined by the facial expression determination unit. User's facial expressions include, for example, smile, blank face, and the like. For example, the screen attention degree determination unit 103 determines a screen attention degree as high when the determined user's facial expression is smile. It is therefore possible to display pieces of push information in the relevance category having a high possibility of being selected by the user, in a display style allowing the user to easily select the pieces of push information. It should be noted that the screen attention degree determination unit 103 may determine a screen attention degree as high when the user's facial expression is predetermined facial expression. It is also possible that the screen attention degree determination unit 103 determines a higher screen attention degree as the user keeps longer a predetermined facial expression.

Various different techniques have been proposed to recognize (determine) facial expression. For example, there is a method of extracting dynamic features based on optical flow, and using a pattern recognition technique such as template matching, Principal Component Analysis (PCA), discrimination analysis, and Support Vector Machine (SVM). In addition, there are many proposed techniques of using timeline pattern recognition techniques such as Hidden Markov Model (HMM). The facial expression determination unit determines facial expression by appropriately using these techniques.

The screen attention degree determination unit 103 may include a speech collection unit that collects speeches. In this case, the screen attention degree determination unit 103 determines a screen attention degree based on detail of user's conversation or an excitement degree of the user's conversation. The conversation is obtained as speech by the speech collection unit.

First, the screen attention degree determination based on detail of conversation is described. Details of conversation are, for example, recognized by a known speech recognition processing. For example, if laugh or the like is included in detail of recognized conversation, the screen attention degree determination unit 103 determines a screen attention degree as high. It is therefore possible to display pieces of push information in the relevance category having a high possibility of being selected by the user, in a display style allowing the user to easily select the pieces of push information. It should be noted that the screen attention degree determination unit 103 may determine a screen attention degree as high when detail of the user's conversation is predetermined detail. It is also possible that a screen attention degree is determined as higher as a duration in which the detail of the conversation is the predetermined state is longer.

Next, the screen attention degree determination based on an excitement degree of conversation is described. Regarding an excitement degree of conversation, for example, if a sound volume of conversation which is larger than a predetermined value is kept for a predetermined time or more, the screen attention degree determination unit 103 determines an excitement degree of conversation as high. The screen attention degree determination unit 103, for example, determines a screen attention degree as high when an excitement degree of conversation is high. It is also possible that the screen attention degree determination unit 103 may determine a screen attention degree as high as a duration in which a sound volume of conversation which is larger than a predetermined value is kept longer.

It is further possible that the screen attention degree determination unit 103 determines a screen attention degree based on a user's operation on the input unit 10 for operating the display control device 1000. For example, the screen attention degree determination unit 103 may determine a screen attention degree as high when a user's operation on the input unit is a predetermined operation, and determine a screen attention degree as low when a user's operation on the input unit is not the predetermined operation. For example, a screen attention degree is determined as high when the number of times the user has operated the input unit 10 is a predetermined number of times (for example, five times) or more, and determined as low when the number of times is less than the predetermined number of times. It is further possible that, for example, a screen attention degree is determined as higher when the number of times the user has operated is greater. It is further possible that, for example, a screen attention degree is determined as high when a frequency the user has operated the input unit 10 is a predetermined frequency (for example, once per ten minutes) or more, and determined as low when the frequency is less than the predetermined frequency. In addition, for example, a screen attention degree may be determined as higher as a frequency of operations is higher.

Figure 12A:
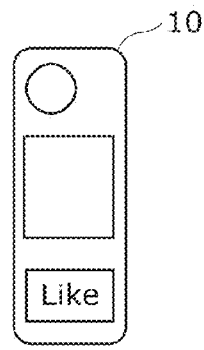
FIG. 12A is a diagram for explaining an example of an input unit.
Figure 12B:
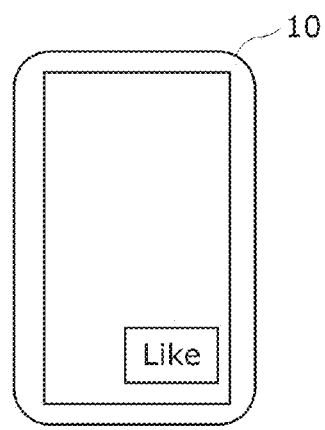
FIG. 12B is a diagram for explaining another example of an input unit.
Figure 12C:
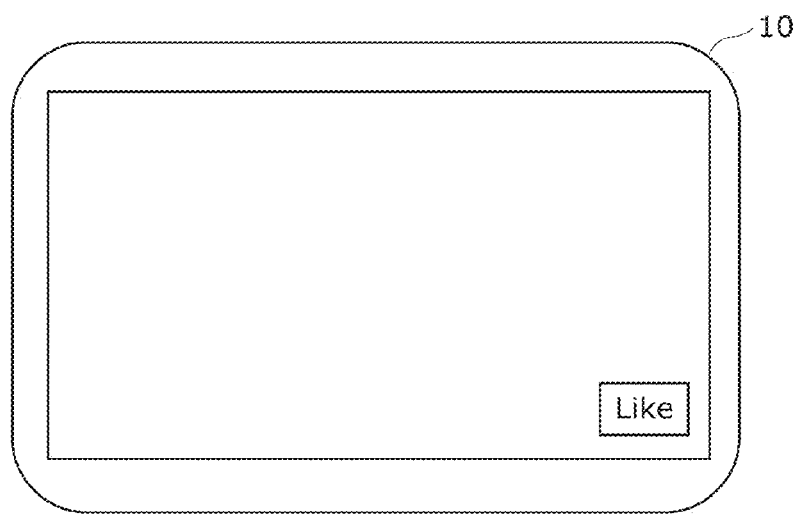
FIG. 12C is a diagram for explaining still another example of an input unit.

Each of FIGS. 12A to 12C is a diagram for explaining an example of the input unit 10 according to the present embodiment.

As described above, the input unit 10 is, for example, a remote controller, a smartphone, a tablet terminal, or the like.

FIG. 12A is an external view of an example of the remote controller. FIG. 12B is an external view of an example of a smartphone. FIG. 12C is an external view of an example of a tablet terminal.

The input unit 10 in each of the figures is provided with a "Like" button physically or as software. The "Like" button is a button with a letter sequence "Like". The "Like" button is pressed by a user when the user enjoys or likes a viewing piece of content.

The screen attention degree determination unit 103 determines a screen attention degree as high when, for example, the user presses such a "Like" button.

[Display Examples]

FIGS. 13A to 18C are diagrams for explaining examples of displaying pieces of push information according to the present embodiment. In FIGS. 13A to 18C, the display unit 100 is assumed to display a piece of content A on the entire screen 100a. Here, in FIGS. 13A to 18C, the user can select pieces of push information displayed on the screen 100a by operating the input unit 10.

Each of FIGS. 13A, 14A, 15A, 16A, 17A, and 18A shows an example of displaying pieces of push information when a selection probability of pieces of relevant information is the highest from among selection probabilities of other categories which are calculated by the selection probability calculation unit 108 at Step S206. Each of the pieces of relevant information is a piece of push information related to the content A.

Each of FIGS. 13B, 14B, 15B, 16B, 17B, and 18B shows an example of displaying pieces of push information when a selection probability of pieces of trend information is the highest from among selection probabilities of other categories which are calculated by the selection probability calculation unit 108 at Step S206.

Each of FIGS. 13C, 14C, 15C, 16C, 17C, and 18C shows an example of displaying pieces of push information when a selection probability of pieces of notification information is the highest from among selection probabilities of other categories which are calculated by the selection probability calculation unit 108 at Step S206

When a screen attention degree is, for example, equal to or more than a predetermined threshold, it is estimated that the user is interested in the viewing content A. Therefore, it is possible to determine a selection probability of the related information of the content A as the highest. On the other hand, if a screen attention degree is, for example, lower than the predetermined value and the number of times the user has operated on the electrical device 301 that transmits notification information is less than a predetermined number of times, a selection probability of the trend information is greater (higher) than a selection probability of the notification information.

Furthermore, if a screen attention degree is, for example, lower than the predetermined value and the number of times the user has operated on the electrical device 301 that transmits notification information is equal to or more than the predetermined number of times, the selection probability of the notification information is greater (higher) than the selection probability of the trend information.

Figure 13A:
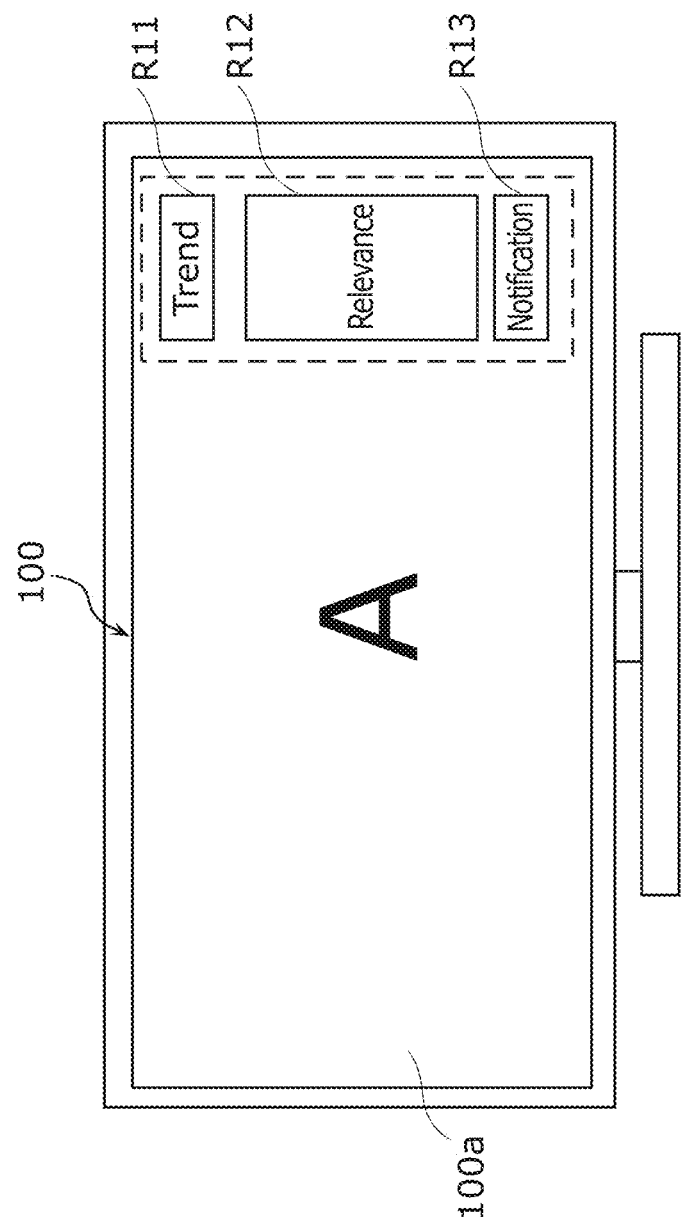
FIG. 13A is a diagram for explaining an example of display of pieces of push information when pieces of relevant information have the highest selection probability.
Figure 13C:
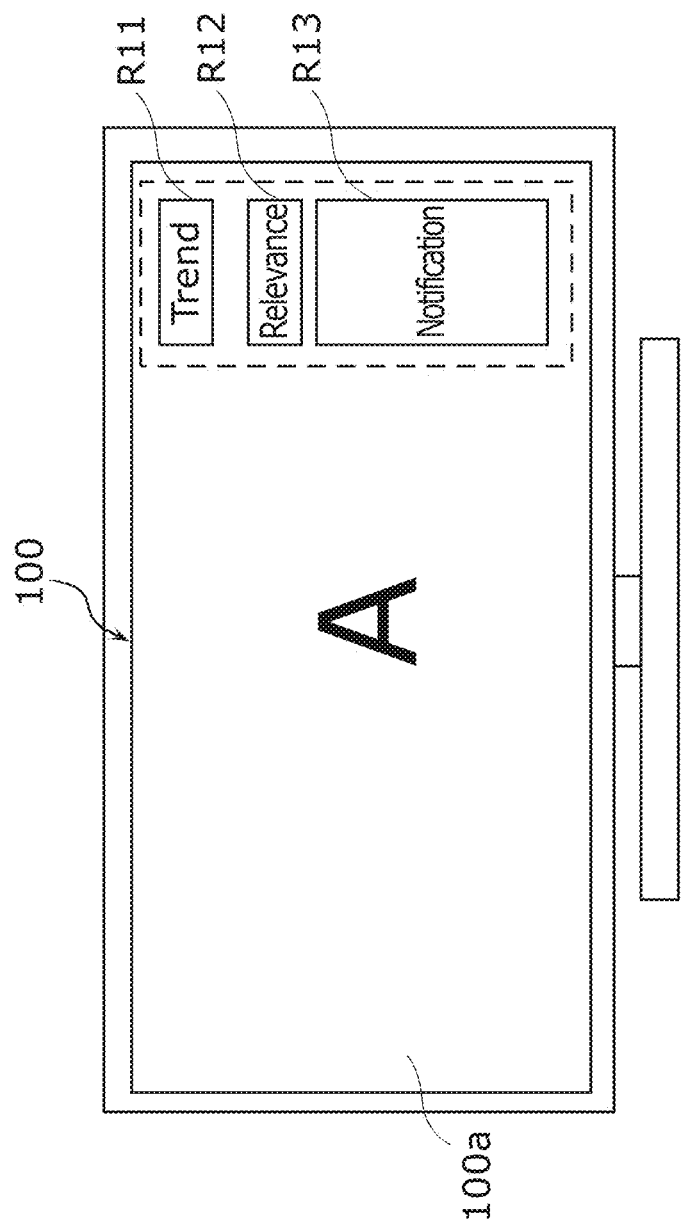
FIG. 13C is a diagram for explaining an example of display of pieces of push information when pieces of notification information have the highest selection probability.

Each of FIGS. 13A to 13C is a diagram showing a state where a size of a display region for pieces of push information is changed according to categories. As shown in FIGS. 13A to 13C, display regions R11, R12, and R13 are arranged on the screen 100a.

The display region R11 is a region in which pieces of push information in the trend information category are displayed. The display region R12 is a region in which pieces of push information in the relevance category are displayed. The display region R13 is a region in which pieces of push information in the notification information category are displayed.

In FIGS. 13A to 13C, the "Trend" is a category name of the trend information category. The "Relevance" is a category name of the relevance category. The "notification" is a category of the notification information.

Here, it is assumed that, according to the display style determined at Step S207, the display style determination unit 109 controls the display unit 100 to display a display region for pieces of push information in a category having the highest selection probability from among the categories to be larger than any other display regions for pieces of push information in the other categories.

In other words, as shown in FIGS. 13A to 13C, a display region for pieces of push information in a category having the highest selection probability from among the categories is displayed larger than any other display regions for pieces of push information in the other categories.

Thereby, the user can easily access the pieces of push information in the category having the highest selection probability by operating the input unit 10. In other words, from among the categories each including pieces of push information, the display control device 1000 can easily select pieces of push information in a category having a high probability of being selected by the user. As described above, it is desirable that a display region for pieces of push information in a category having the highest selection probability is displayed as the largest.

Figure 14A:
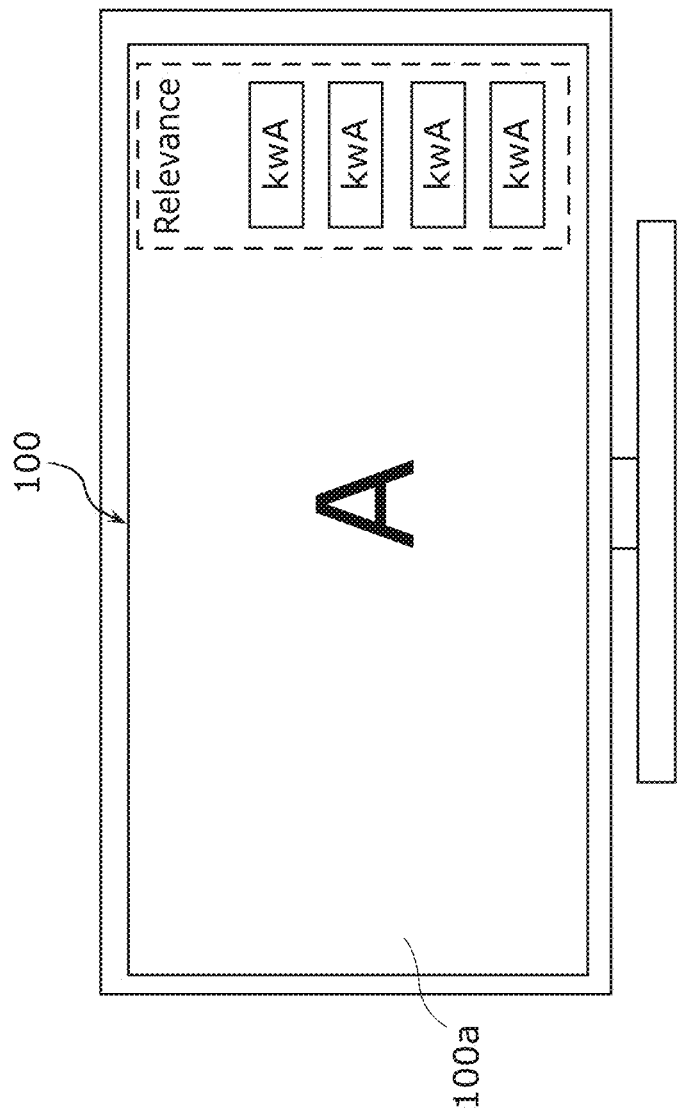
FIG. 14A is a diagram for explaining another example of display of pieces of push information when pieces of relevant information have the highest selection probability.

It is also possible that, as shown in FIGS. 14a to 14C, only pieces of push information in a category having the highest selection probability are displayed, and pieces of push information in the other categories are not displayed. In FIGS. 14a to 14C, kwA represents a piece of push information in the relevance category. kw represents a piece of push information in the trend information category. ntX represents a piece of push information in the notification information category.

Figure 15A:
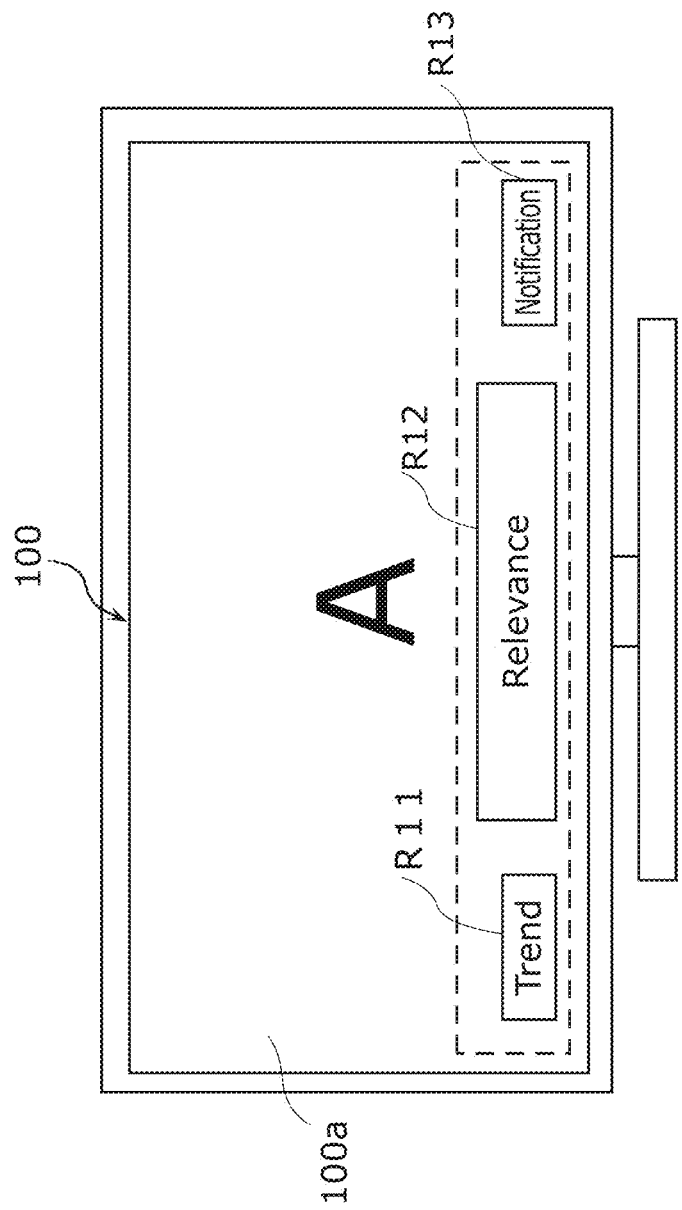
FIG. 15A is a diagram for explaining still another example of display of pieces of push information when pieces of relevant information have the highest selection probability.
Figure 15B:
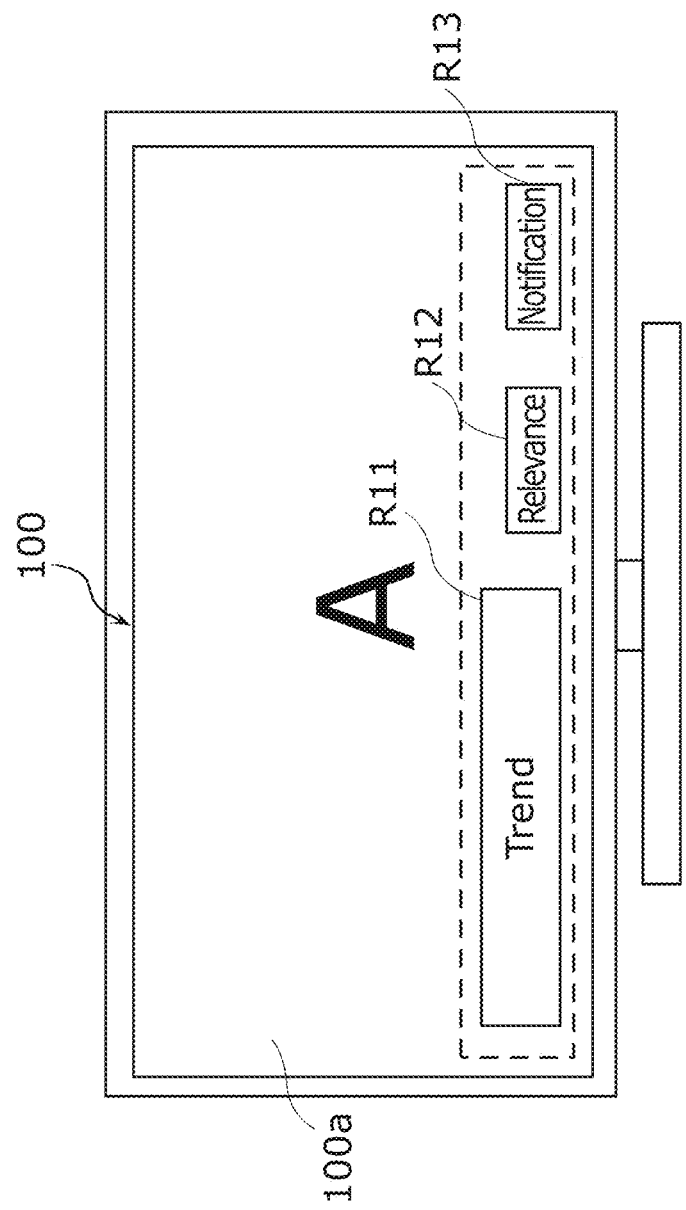
FIG. 15B is a diagram for explaining still another example of display of pieces of push information when pieces of trend information have the highest selection probability.

It should be noted that in FIGS. 13A to 13C and 14A to 14C, the pieces of push information are displayed vertically at the right edge of the screen 100a, but the displaying arrangement is not limited to this. For example, the pieces of push information may be arranged horizontally at the bottom of the screen 100a not to overlap each other, as shown in FIGS. 15A to 15C.

In FIGS. 13A to 15C, pieces of push information are displayed overlapping the content A. In other words, the display style determination unit 109 displays pieces of push information in a determined display style to overlap the content A. This allows the user to notice the pieces of push information displayed on the screen without interrupting user's viewing of the content A.

Figure 16A:
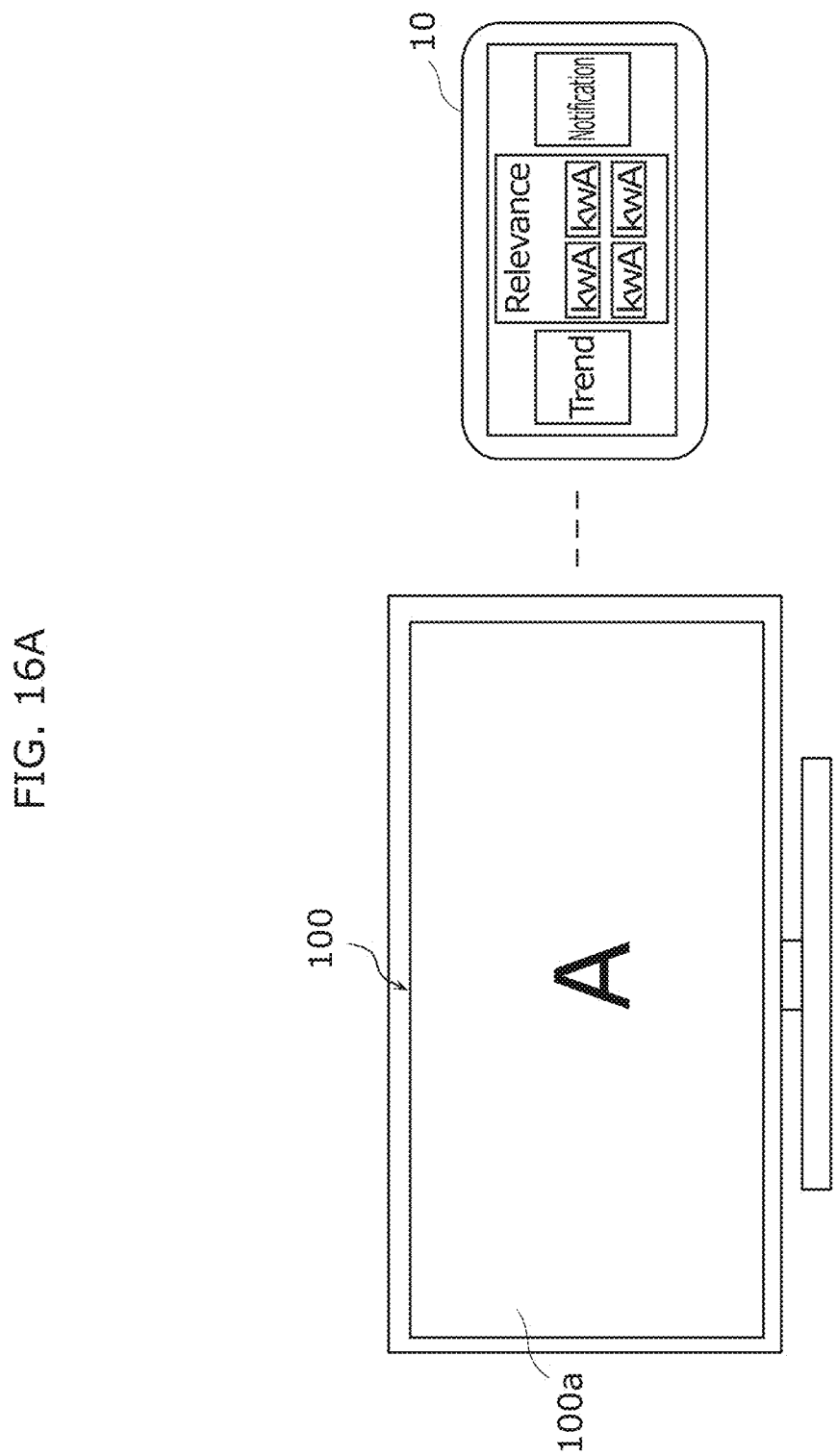
FIG. 16A is a diagram for explaining still another example of display of pieces of push information when pieces of relevant information have the highest selection probability.

Each of FIGS. 16A to 16C is a diagram showing a state where pieces of push information are not displayed overlapping the content A, but displayed on a so-called second display (input unit 10) such as a smartphone or a tablet terminal.

It should be noted that, at Step S207, the display style determination unit 109 may determine a display style of a display label of a category having the highest selection probability among the categories to be displayed in more detail than display styles of display labels of the other categories.

Then, the display style determination unit 109 provides pieces of push information for which a display style is determined, to the input unit 10 so that the input unit 10 can display the pieces of push information in the determined display style. As a result, the input unit 10 displays the pieces of push information in the determined display style.

As a result, as shown in FIGS. 16A to 16C, specific keywords (pieces of push information) are displayed only for a category having the highest selection probability, while only category names (display labels) such as "Trend", "Relevance", and "Notification" are abstractly displayed for the other categories. In other words, the display style determination unit 109 associates a display label of the category having the highest selection probability with the category and the pieces of push information in the category, and associates each of the display labels of the other categories only with a corresponding category. As a result, the user can easily check the pieces of push information in the category having the highest selection probability.

As described above, the display style for the display label of the category having the highest selection probability is displayed in more detail than any other display styles for the display labels of the other categories. As a result, the user can easily access pieces of push information in the category having the highest selection probability, by operating the input unit 10. In other words, from among the categories each including pieces of push information, the display control device 1000 can easily select pieces of push information in a category having a high probability of being selected by the user. In addition, the other categories except the category having the highest selection probability are abstractly displayed in comparison to the category having the highest selection probability. This reduces botheration in viewing the screen.

It should be noted that according to the display style determined at Step S207, the display style determination unit 109 may control the display unit so that the number of displayed pieces of push information in a category having the highest selection probability in the categories is greater than the number of displayed pieces of push information in any one of the other categories. As a result, the user can easily select the pieces of push information in the category having the highest selection probability.

Figure 17C:
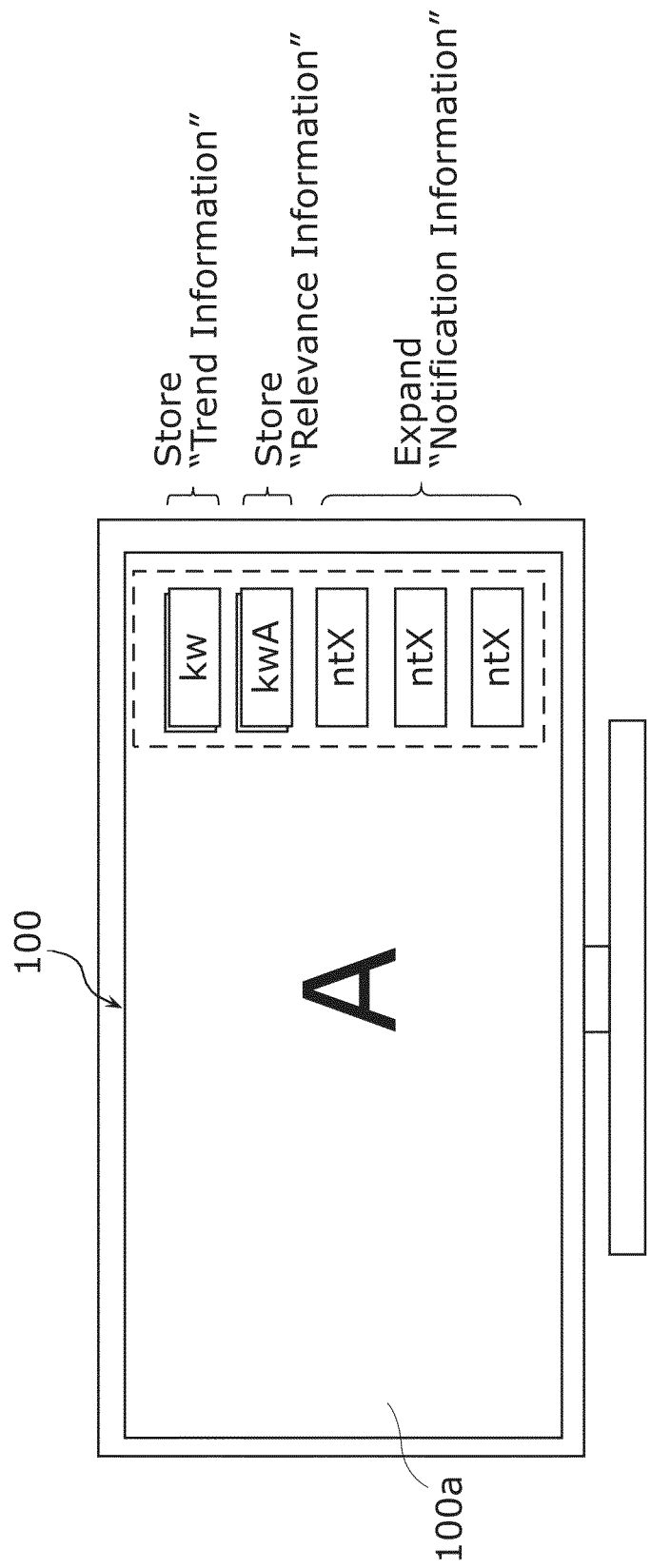
FIG. 17C is a diagram for explaining still another example of display of pieces of push information when pieces of notification information have the highest selection probability.

In this case, as shown in FIG. 17A to 17C, the number of displayed pieces of push information in a category having the highest selection probability is maximum. In other words, among the categories, the number of displayed pieces of push information in a category having the highest selection probability is set to be greater than the number of displayed pieces of push information in any one of the other categories. More specifically, the display style determination unit 109 displays a plurality of display labels of the pieces of push information in the category having the highest selection probability to be arranged not to overlap each other, and displays display labels of pieces of push information in each of the other categories to overlap each other.

In this way, if the number of displayed pieces of data in a category having the highest selection probability is set to maximum, the user can easily access the pieces of push information in the category by operating the input unit 10. In other words, from among the categories each including pieces of push information, the display control device 1000 can easily select pieces of push information in a category having a high probability of being selected by the user.

Each of FIGS. 18A to 18C shows a state where pieces of push information in a category having the highest selection probability are focused. In this way, it is possible to focus pieces of push information in a category having the highest selection probability to maximize the number of displayed pieces of push information in the category. More specifically, the display style determination unit 109 may determine a chain including pieces of push information and move the pieces of push information forming the chain in a chain direction so that a focus point that is a group of pieces of push information in the category having the highest selection probability is located on the screen.

It should be noted that a screen attention degree may be determined based on other elements rather than a user's sight line direction. For example, the screen attention degree determination unit 103 may determine a screen attention degree based on a genre of a piece of content displayed on the display unit 100. In other words, it is possible that each piece of content is associated with a predetermined attention degree corresponding to a genre of the content, and the screen attention degree determination unit 103 determine an attention degree based on the genre of the content displayed on the screen.

Thereby, based on a genre of a piece of content, it is possible to display pieces of push information having a high possibility of being selected by the user. For example, if a genre of a piece of content is a drama, the user often pays attention to the screen to understand a drama's story. This means that a screen attention degree is high. Therefore, in this case, pieces of push information related to the content are displayed in a display style allowing the user to easily select the pieces of push information. As a result, there is a high possibility that the user paying attention to the screen to understand a drama's story will select the pieces of push information. On the other hand, for example, if a genre of a piece of content is a variety program, the user is often doing other thing viewing the screen, in other words, the user is often not concentrated on the content. This means that a screen attention degree is low. Therefore, in this case, pieces of push information not related to the content are displayed in a display style allowing the user to easily select the pieces of push information. As a result, there is a high possibility that the user not concentrated on the content will select the pieces of push information.

Furthermore, the screen attention degree determination unit 103 may determine a screen attention degree based on how much viewing of a piece of content displayed on the display unit 10 is completed (a viewing completion rate). In other words, it is possible that each piece of content is associated with a viewing completion rate of the content, and the screen attention degree determination unit 103 determines a screen attention degree as high when the viewing completion rate of the content displayed on the screen is equal to or more than a predetermined threshold (for example, 70%), and determines as low when the viewing completion rate is less than the threshold. Thereby, it is possible that, when a viewing completion rate is high (for example, more than 70%), pieces of push information in the relevance category are displayed in a display style allowing the user to easily select the pieces of information. It should be noted that the screen attention degree determination unit 103 may determine a screen attention degree as higher as a viewing completion rate of a piece of content displayed on the screen is higher.

It should be noted that displayed pieces of push information in FIGS. 13A to 13C, 14A to 14C, 15A to 15C, and 17A to 17C are displayed, for example, when it is determined that the user holds the input unit 10.

(Variation 1)

A display control device according to a variation of the above-described embodiment is almost the same as the display control device 1000 according to the embodiment, but differs in a structure of the screen attention degree determination unit. The following describes mainly differences from the display control device 1000 according to the embodiment.

Figure 19:
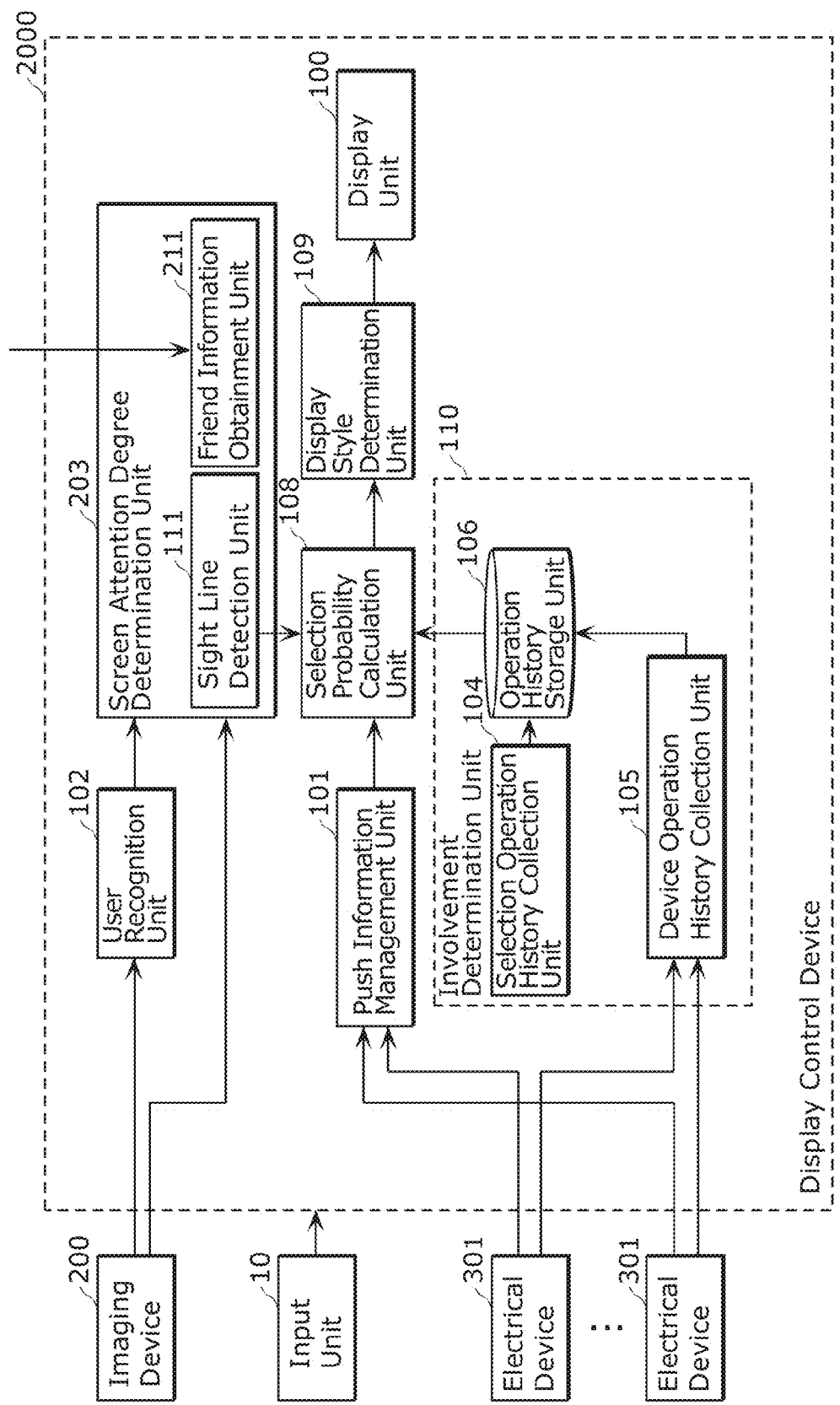
FIG. 19 is a block diagram showing in detail a functional structure of a display control device according to Variation 1.

FIG. 19 is a block diagram showing a functional structure of the display control device 2000 according to the present variation in detail.

The display control device 2000 in FIG. 19 differs from the display control device 1000 according to the embodiment shown in FIG. 3 in that a screen attention degree determination unit 203 is provided instead of the screen attention degree determination unit 103. The screen attention degree determination unit 203 differs from the screen attention degree determination unit 103 in including a friend information obtainment unit 211 that obtains (a) a list of user's friends and (b) content viewing information indicating pieces of content which the user's friends have viewed. The screen attention degree determination unit 203 determines a screen attention degree as higher as the number of user's friends having viewed the same content as currently displayed on the display unit 100 is greater.

More specifically, the friend information obtainment unit 211 has a friend list holding information indicating friends associated with the user. The friend information obtainment unit 211 also obtains a viewer list holding information indicating viewers associated with a piece of content received by the display control device 1000. The screen attention degree determination unit 203 compares the friend list to the viewer list, and determines a screen attention degree as higher as the number of friends having viewed the content displayed on the display unit 100 is greater.

Thereby, as the number of friends having viewed the content currently displayed by the display unit 100 is greater, in other words, if the content is more popular among the friends, pieces of push information in the relevance category are displayed in a display style allowing the user to more easily select the piece of push information. The content which is popular among the user's friends is estimated as a piece of content which the user is also interested in. Therefore, there is a high possibility that the user will select pieces of push information in the relevance category. In short, when many friends of the user have viewed the content, pieces of push information having a possibility of being selected by the user can be displayed in a display style allowing the user to easily select the pieces of push information.

(Variation 2)

A display control device according to a variation of the above-described embodiment is almost the same as the display control device 1000 according to the embodiment, but differs in a structure of the screen attention degree determination unit. The following describes mainly differences from the display control device 1000 according to the embodiment.

Figure 20:
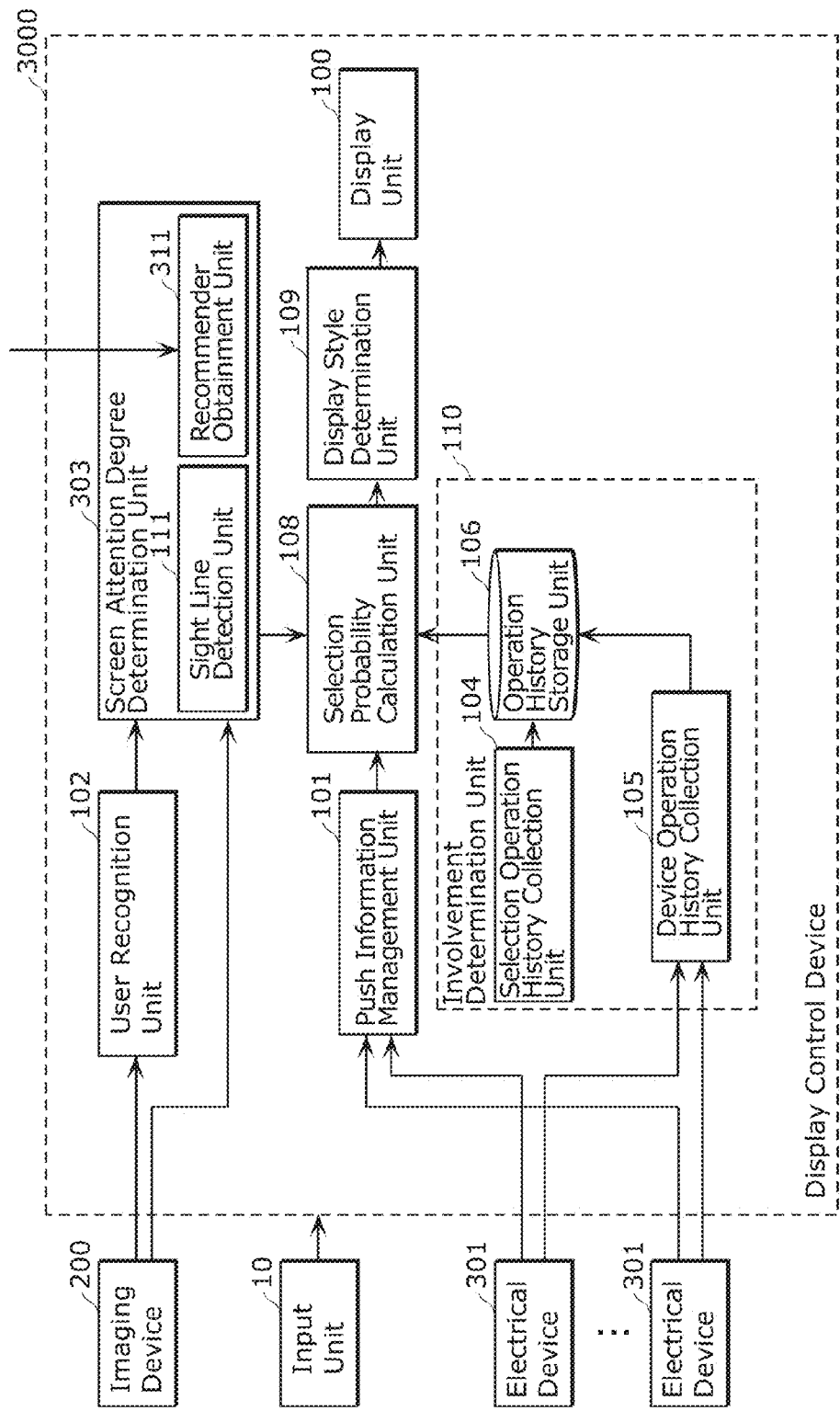
FIG. 20 is a block diagram showing in detail a functional structure of a display control device according to Variation 2.

FIG. 20 is a block diagram showing a functional structure of a display control device 3000 according to the present variation in detail.

The display control device 3000 in FIG. 20 differs from the display control device 1000 according to the embodiment shown in FIG. 3 in that a screen attention degree determination unit 303 is provided instead of the screen attention degree determination unit 103. The screen attention degree determination unit 303 differs from the screen attention degree determination unit 103 in including a recommender obtainment unit that obtains information indicating recommenders (curators) of a piece of content displayed on the display unit 100. The screen attention degree determination unit 303 determines a screen attention degree as higher as a rank order of a recommender of the content displayed on the display unit 100 is higher.

More specifically, the recommender obtainment unit 311 has a recommender rank order list holding (a) information of recommenders associated with the user and (b) information indicating a rank order of each of the recommenders. The recommender obtainment unit 311 also obtains a recommender list holding information indicating recommenders associated with a piece of content received by the display control device 1000.

The recommenders associated with the content are, for example, viewers pressing a "Like" button shown in FIGS. 12A to 12C among viewers having viewed the same content as displayed on the display unit 100. In other words, if a viewer presses a "Like" button in viewing a piece of content, the viewer is considered as a recommender of the content.

The recommender rank order list holds (a) recommenders associated with the user and (b) information indicating rank orders of the respective recommenders. The recommender rank order is higher as a total number of votes by viewers in a predetermined range is greater.

The screen attention degree determination unit 303 compares the recommender rank order list to the recommender list to determine whether or not a recommender of the content displayed on the display unit 100 is included in the recommender rank order list. If the recommender is included in the recommender rank order list, a screen attention degree is determined as higher as a rank order of the recommender is higher.

As described above, the screen attention degree determination unit 303 according to the present variation includes a recommender obtainment unit that obtains information indicating recommenders (curators) of a piece of content displayed on the display unit 100, and determines that a screen attention degree is higher as a rank order of a recommender of the content displayed on the display unit is higher.

Thereby, as a rank order of a recommender of a piece of content displayed on the display unit 100 is higher, pieces of push information in the relevance category are displayed in a display style allowing the user to more easily select the pieces of push information. It is supposed that a piece of content recommended by a recommender in a higher rank order is useful for the user. Therefore, there is a high possibility that the user will select the pieces of push information in the relevance category. In other words, it is possible to display pieces of push information related to a piece of content recommended by a recommender in a high rank order, in a display style allowing the user to easily select the pieces of push information.

It is also possible that a rank order of a recommender is higher as the of votes by viewers in a predetermined range is grater. More specifically, a recommender is considered as being voted when a viewer in a predetermined range and viewing a piece of content recommended by the recommender presses a "Like" button as shown in FIGS. 12A to 12C.

Therefore, pieces of push information recommended by a recommender having more votes of viewers in a predetermined range can be displayed in a display style allowing the user to more easily select the pieces of push information. For example, if the predetermined range is a group of viewers having similar preference to that of the user, pieces of push information which the user prefers more can be displayed in a display style allowing the user to more easily select the pieces of push information.

It should be noted that a rank order of recommenders may be a predetermined rank order corresponding to the user. In other words, the rank order of recommenders may not be updated.

It should also be noted that the display control devices 1000, 2000, and 3000 according to the above-described embodiment and variations do not need to include the display unit 100 and the user recognition unit 102.

In each of the above-described embodiment and variations, each of structural elements may be implemented as a dedicated hardware or executed by a software program suitable for the structural element. Each of the structural elements may be implemented when a program execution unit, such as a Central Processing Unit (CPU) or a processor, reads a software program from a recording medium, such as a hard disk or a semiconductor memory, and then executes the read-out software program. The software for implementing the display control devices according to the above-described embodiment and variations is as follows.

A program causing a computer to control a display unit having a screen to perform displaying, the program casing the computer to execute: obtaining items each belonging to any one of categories; determining a screen attention degree indicating how much a user pays attention to the screen of the display unit; collecting selection operation history information indicating a history of selection of each of the categories; calculating a selection probability of being selected by the user, for each of the categories based on the screen attention degree and the selection operation history information; and (i) determining a display style allowing the user to more easily select an item in a category having a higher selection probability among the categories, and (ii) causing the display unit to display the item in the determined display style, wherein the categories include a relevance category that is a category including items related to a piece of content displayed on the screen, and the calculating includes: calculating a selection probability of the relevance category in a case where the screen attention degree is a first attention degree to be higher than a selection probability of the relevance category in a case where the screen attention degree is a second attention degree that is lower than the first attention degree; and calculating, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

As described above, although display control devices according to the embodiment and its variation have been described, the present disclosure is not limited to any one of the embodiment and the variations. Those skilled in the art will be readily appreciated that various modifications of the embodiment and the variation and combinations of the structural elements of the embodiment and the variations are possible without materially departing from the novel teachings and advantages of the present disclosure. Accordingly, all such modifications and combinations are intended to be included within the scope of the present disclosure.

The following variations are also possible.

(i) The above-described display control device may be, more specifically, a computer system including a microprocessor, a Read Only Memory (ROM), a Random Access Memory (RAM), a hard disk unit, a display unit, a keyboard, a mouse, and the like. Each of the ROM and the hard disk unit holds a computer program. The microprocessor operates according to the computer program to allow the display control device to execute its functions.

Here, each of the computer programs is combinations of a plurality of instruction codes for issuing instructions to the computer to execute predetermined functions. Each of the devices is not limited to the computer system including a microprocessor, a ROM, a RAM, a hard disk unit, a display unit, a keyboard, a mouse, and the like. It may be a computer system including a part of them.

(2) A part or all of the structural elements included in the above-described display control device may be implemented to a single system Large Scale Integration (LSI). The system LSI is a multi-functional LSI in which a plurality of elements are integrated into a single chip. An example of such a system LSI is a computer system including a microprocessor, a ROM, a Random Access Memory (RAM), and the like. A computer program is recorded on the ROM. The microprocessor operates according to the computer program to allow the system LSI to execute its functions.

Here, the integrated circuit is referred to as a system LSI, but the integrated circuit can be called an IC, an LSI, a super LSI or an ultra LSI depending on their degrees of integration. Note also that the technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. For example, biotechnology and the like can be applied to the above implementation.

(3) A part or all of the structural elements included in the above-described display control device may be implemented to an Integrated Circuit (IC) card or a single module that is removable from the display control device. The IC card or the module is a computer system including a microprocessor, a ROM, a RAM, and the like. The IC card and the module may include the above-described multi-functional LSI. The microprocessor operates according to a computer program to allow the IC card or the module to execute its functions. The IC card or the module may have tamper resistance.

(4) The present disclosure may be a method including steps performed by characteristic structural units included in the above-described display control device. The present disclosure may be a computer program causing a computer to execute the method, or digital signals indicating the computer program.

It should also be noted that the present disclosure may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blue-ray® Disc), and a semiconductor memory. The present disclosure may be the computer program or the digital signals recorded on these recording mediums.

It should also be noted in the present disclosure that the computer program or the digital signals may be transmitted via an electric communication line, a wired or wireless communication line, a network represented by the Internet, data broadcasting, and the like.

It should also be noted that the present disclosure may be a computer system including a microprocessor and a memory. The memory may hold the computer program. The microprocessor may operate according to the computer program.

It should also be noted that the program or the digital signals may be recorded onto the recording medium to be transferred, or may be transmitted via a network or the like, so that the program or the digital signals can be executed by a different independent computer system.

(5) The above-described embodiment and variations may be combined.

(6) The above-described display control device may be embedded in a smart television set, a tablet that can reproduce video with 4k2k resolution and 20-inch size, a cradle, or the like. By embedding the display control device according to the present disclosure, it is possible to implement a smart television set, a tablet, and a cradle which are capable of displaying information having a high possibility of being selected by the user.

It should also be noted that the embodiment and variations disclosed above are merely exemplary in every aspect and do not limit the present disclosure. The scope of the present disclosure is indicated not by the above description but by the appended claims. Any modifications in the embodiment and variations are intended to have the same meaning and be included within the scope of the claims.

INDUSTRIAL APPLICABILITY

The display control device according to an aspect of the present disclosure is useful as a device and the like of performing display control so that the user can easily access a category having a high probability of being selected by the user among pieces of information in various categories.

REFERENCE SIGNS LIST

100 display unit
101 push information management unit
102 user recognition unit
103, 203, 303 screen attention degree determination unit
104 selection operation history collection unit
105 device operation history collection unit
106 operation history storage unit
108 selection probability calculation unit
109 display style determination unit
110 involvement determination unit
111 sight line detection unit
200 imaging device
211 friend information obtainment unit
311 recommender obtainment unit
1000, 2000, 3000 display control device

The invention claimed is:

1. A display control device that controls a display unit having a screen to perform displaying, the display control device comprising:
   a management unit configured to manage items each belonging to any one of categories;
   a screen attention degree determination unit configured to determine a screen attention degree indicating how much a user pays attention to the screen of the display unit;
   a selection operation history collection unit configured to collect selection operation history information indicating a history of selection of each of the categories;
   a selection probability calculation unit configured to calculate a selection probability of being selected by the user, for each of the categories based on the screen attention degree and the selection operation history information; and a display style determination unit configured to (i) determine a display style allowing the user to more easily select an item in a category having a higher selection probability among the categories, and (ii) cause the display unit to display the item in the determined display style, wherein the categories include a relevance category that is a category including items related to a piece of content displayed on the screen, and the selection probability calculation unit is configured to:

calculate a selection probability of the relevance category in a case where the screen attention degree is a first attention degree to be higher than a selection probability of the relevance category in a case where the screen attention degree is a second attention degree that is lower than the first attention degree; and calculate, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

2. The display control device according to claim 1, wherein the display control device communicates at least one electrical device, the categories including a notification category that is a category includes items notified from the at least one electrical device, the display control device further comprises a device operation history collection unit configured to collect device operation history information indicating a history of operation of the at least one electrical device by the user, and the selection probability calculation unit is further configured to calculate, based on the device operation history information, a selection probability of the notification category in a case where a total number of operation times the at least one electrical device has been operated is a third number, to be higher than a selection probability of the notification category in a case where the total number of the operation times is a fourth number that is smaller than the third number.

3. The display control device according to claim 2, wherein each of the items in the notification category is associated with an announcement intensity which is an importance of notifying the user of the each of the items, and the selection probability calculation unit is configured to calculate a selection probability of the notification category in a case where the announcement intensity is a first intensity, to be higher than a selection probability of the notification category in a case where the announcement intensity is a second intensity that is lower than the first intensity.

4. The display control device according to claim 1, wherein the items each belonging to any one of categories are push information transmitted from an external device communicating with the display control device.

5. The display control device according to claim 1, wherein the display unit is configured to display a piece of content, and the display style determination unit is configured to cause the display unit to display the items each belonging to any one of categories to overlap the piece of content in the determined display style.

6. The display control device according to claim 1, wherein the display style determination unit is configured to determine a display style of a display label of a category having a highest selection probability among the categories to be displayed in more detail than a display style of a display label of an other category other than the category having the highest selection probability.

7. The display control device according to claim 6, wherein the display style determination unit is configured to associate the display label of the category having the highest selection probability with the category and each of items belonging to the category, and associate the display style of the display label of the other category only with the other category.

8. The display control device according to claim 1, wherein the display style determination unit is configured to determine a display region for each of items in a category having a highest selection probability among the categories to be larger than a display region for each of items in an other category other than the category having the highest selection probability.

9. The display control device according to claim 1, wherein the display style determination unit is configured to cause a total number of displayed items in a category having a highest selection probability among the categories to be greater than a total number of displayed items in an other category other than the category having the highest selection probability.

10. The display control device according to claim 9, wherein the display style determination unit is configured to determine to display display labels of the items in the category having the highest selection probability to be arranged not to overlap each other, and display display labels of items in the other category to overlap each other.

11. The display control device according to claim 9, wherein the display style determination unit is configured to determine a chain including the items each belonging to any one of categories, and move the items forming the chain in a chain direction to locate a focus position on the screen, the focus position being the items in the category having the highest selection probability.

12. The display control device according to claim 1, wherein the screen attention degree determination unit includes a sight line detection unit configured to detect a sight line direction of the user, and the screen attention degree determination unit is configured to determine the screen attention degree based on the sight line direction detected by the sight line detection unit.

13. The display control device according to claim 1, wherein the display unit is configured to display a piece of content, and the screen attention degree determination unit is configured to determine the screen attention degree based on a genre of the piece of content displayed by the display unit.

14. The display control device according to claim 1, wherein the display unit is configured to display a piece of content, and the screen attention degree determination unit is configured to determine the screen attention degree based on a viewing completion rate of the piece of content displayed by the display unit.

15. The display control device according to claim 1, wherein the display control device is operated by an input unit used to operate the display control device, and
the screen attention degree determination unit is configured to determine the screen attention degree based on user's operation on the input unit.

16. The display control device according to claim 15, wherein the input unit is a remote controller.

17. The display control device according to claim 15, wherein the input unit is one of a smartphone and a tablet terminal.

18. The display control device according to claim 1, wherein the screen attention degree determination unit further includes a facial expression determination unit configured to determine facial expression of the user, and
the screen attention degree determination unit is configured to determine the screen attention degree based on the facial expression of the user which is determined by the facial expression determination unit.

19. The display control device according to claim 1, wherein the screen attention degree determination unit further includes a speech obtaining unit configured to obtain speech, and
the screen attention degree determination unit is configured to determine the screen attention degree based on detail of conversation of the user which is obtained as the speech by the speech obtaining unit.

20. The display control device according to claim 1, wherein the screen attention degree determination unit further includes a speech obtaining unit configured to obtain speech, and
the screen attention degree determination unit is configured to determine the screen attention degree based on an excitement degree of conversation of the user which is obtained as the speech by the speech obtaining unit.

21. The display control device according to claim 1, further comprising
a user recognition unit configured to recognize the user existing in front of the screen of the display unit,
wherein the screen attention degree determination unit further includes a friend information obtainment unit configured to obtain (a) a list of friends of the user and (b) content viewing information indicating pieces of content viewed by the friends, and
the screen attention degree determination unit is configured to determine the screen attention degree as higher as a total number of friends who have viewed a piece of content currently displayed by the display unit is greater.

22. The display control device according to claim 1, wherein the screen attention degree determination unit further includes a recommender obtainment unit configured to obtain information indicating a recommender of a piece of content displayed by the display unit, and
the screen attention degree determination unit is configured to determine the screen attention degree as higher as a rank order of the recommender of the piece of content displayed by the display unit is higher.

23. The display control device according to claim 22, wherein the rank order of the recommender is higher as a total number of votes by viewers in a predetermined range is greater.

24. An integrated circuit that controls a display unit having a screen to perform displaying, the integrated circuit comprising:
 a management unit configured to manage items each belonging to any one of categories;
 a screen attention degree determination unit configured to determine a screen attention degree indicating how much a user pays attention to the screen of the display unit;
 a selection operation history collection unit configured to collect selection operation history information indicating a history of selection of each of the categories;
 a selection probability calculation unit configured to calculate a selection probability of being selected by the user, for each of the categories based on the screen attention degree and the selection operation history information; and
 a display style determination unit configured to (i) determine a display style allowing the user to more easily select an item in a category having a higher selection probability among the categories, and (ii) cause the display unit to display the item in the determined display style,
 wherein the categories include a relevance category that is a category including items related to a piece of content displayed on the screen, and
 the selection probability calculation unit is configured to:
 calculate a selection probability of the relevance category in a case where the screen attention degree is a first attention degree to be higher than a selection probability of the relevance category in a case where the screen attention degree is a second attention degree that is lower than the first attention degree; and
 calculate, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

25. A display control method of controlling a display unit having a screen to perform displaying, the display control method comprising:
 obtaining items each belonging to any one of categories;
 determining a screen attention degree indicating how much a user pays attention to the screen of the display unit;
 collecting selection operation history information indicating a history of selection of each of the categories;
 calculating a selection probability of being selected by the user, for each of the categories based on the screen attention degree and the selection operation history information; and
 (i) determining a display style allowing the user to more easily select an item in a category having a higher selection probability among the categories, and (ii) causing the display unit to display the item in the determined display style,
 wherein the categories include a relevance category that is a category including items related to a piece of content displayed on the screen, and
 the calculating includes:
 calculating a selection probability of the relevance category in a case where the screen attention degree is a first attention degree to be higher than a selection probability of the relevance category in a case where the screen attention degree is a second attention degree that is lower than the first attention degree; and calculating, for each of the categories, a selection probability in a case where a total number of selection times the each of the categories has been selected is a first number, to be higher than a selection probability in a case where the total number of the selection times is a second number that is smaller than the first number, the calculating being performed based on the selection operation history information.

26. A non-transitory computer-readable recording medium for use in a computer, the recording medium having a computer program recorded thereon for causing the computer to execute the display control method according to claim 25.

* * * * *